United States Patent
Olander

(10) Patent No.: US 9,894,988 B2
(45) Date of Patent: Feb. 20, 2018

(54) STAND FOR SUPPORTING A COMPUTING DEVICE

(71) Applicant: James D. Olander, Denver, CO (US)

(72) Inventor: James D. Olander, Denver, CO (US)

(*) Notice: Subject to any disclaimer, the term of this patent is extended or adjusted under 35 U.S.C. 154(b) by 0 days.

(21) Appl. No.: 15/143,276

(22) Filed: Apr. 29, 2016

(65) Prior Publication Data

US 2016/0316905 A1 Nov. 3, 2016

Related U.S. Application Data

(60) Provisional application No. 62/154,546, filed on Apr. 29, 2015.

(51) Int. Cl.
| | |
|---|---|
| *A47B 23/04* | (2006.01) |
| *F16M 11/04* | (2006.01) |
| *F16M 11/10* | (2006.01) |
| *F16M 11/38* | (2006.01) |
| *F16M 11/24* | (2006.01) |
| *A47B 97/00* | (2006.01) |

(52) U.S. Cl.
CPC ........... *A47B 23/04* (2013.01); *F16M 11/041* (2013.01); *F16M 11/10* (2013.01); *F16M 11/247* (2013.01); *F16M 11/38* (2013.01); *A47B 2023/049* (2013.01); *A47B 2097/006* (2013.01); *F16M 2200/024* (2013.01); *F16M 2200/028* (2013.01); *F16M 2200/08* (2013.01)

(58) Field of Classification Search
CPC .............. A47B 23/04; A47B 2023/049; F16M 11/041; F16M 11/38

USPC .................................................. 248/447, 450
See application file for complete search history.

(56) References Cited

U.S. PATENT DOCUMENTS

| | | | | |
|---|---|---|---|---|
| 5,845,889 | A * | 12/1998 | Suzuki ................ | A47B 21/045 24/67.11 |
| 6,676,100 | B2 * | 1/2004 | Hsu .......................... | G09F 1/10 248/441.1 |
| 8,020,818 | B2 * | 9/2011 | Chou .................... | F16M 11/10 248/165 |
| 8,708,298 | B2 * | 4/2014 | Hu ........................ | F16M 11/041 248/371 |
| 8,899,543 | B2 * | 12/2014 | Liang .................... | A47B 23/043 248/166 |
| 9,104,372 | B2 * | 8/2015 | Frenzel ................. | G06F 1/1632 |
| 9,211,001 | B2 * | 12/2015 | Negretti ................ | A47B 23/04 |
| 2010/0213330 | A1 * | 8/2010 | Downing ............... | F16M 13/00 248/176.3 |
| 2011/0226916 | A1 * | 9/2011 | Leung ...................... | A01G 1/08 248/156 |
| 2012/0145835 | A1 * | 6/2012 | Zaharakis .............. | F16M 11/22 248/65 |
| 2013/0001379 | A1 * | 1/2013 | Hobbs .................... | F16M 11/10 248/126 |
| 2013/0048801 | A1 * | 2/2013 | Weinberg ............. | F16M 11/041 248/121 |

(Continued)

*Primary Examiner* — Eret C McNichols
(74) *Attorney, Agent, or Firm* — Dorsey & Whitney LLP

(57) ABSTRACT

A stand for supporting a computing device and a method of assembling the stand are provided. The stand may support the computing device at a height such that a screen of the computing device is at or near eye-level of a user. The stand may include a frame member and a gripping mechanism attached to an end of the frame member. The gripping mechanism may secure the computing device to the stand.

20 Claims, 20 Drawing Sheets

(56) References Cited

U.S. PATENT DOCUMENTS

2013/0277529 A1\* 10/2013 Bolliger ................. F16M 11/10
                                                            248/676
2016/0138753 A1\*  5/2016 Crossland .............. F16M 13/02
                                                            248/447

\* cited by examiner

STAND FOR SUPPORTING A COMPUTING DEVICE

CROSS-REFERENCE TO RELATED APPLICATIONS

This application claims the benefit under 35 U.S.C. 119(e) of the filing date of U.S. Provisional Patent Application Ser. No. 62/154,546, filed Apr. 29, 2015, and entitled "Height-Adjustable Stand for Supporting a Laptop Computer," the entire disclosure of which is hereby incorporated by reference herein.

TECHNICAL FIELD

The present disclosure relates to an accessory for a computing device. More specifically, the present disclosure relates to a stand for supporting a computing device, such as a laptop computer.

BACKGROUND

The prevalence of repetitive use injuries from consumer electronics is continually increasing amongst technology users. For example, when situated on a desk or table, a laptop computer has a screen that is positioned typically one to three feet lower than eye level. This positioning arrangement forces a head-down user posture that is dangerous for extended sessions at the laptop computer and contributes greatly to computer-related repetitive use injuries.

SUMMARY

This disclosure relates generally to a stand for positioning a mobile computing device at an elevated position. When used in association with a laptop computer, the stand may elevate a laptop screen to near eye-level so that a user may maintain a more ergonomically-correct working position, thereby reducing repetitive use injuries from using the laptop computer. The stand may be portable, allowing a user to work at remote locations away from their home or office in a more ergonomically-correct working position.

In one example, a stand for supporting a laptop computer having a chassis and a screen may be provided. The stand may include support legs, rotating legs attached to the support legs to provide an offset to the support legs, and gripping mechanisms attached to ends of the rotating legs and attachable to the lower edge of the laptop such that the laptop is suspended from the bottom edge of the chassis.

The stand may include high-tack resting surfaces attached to the support legs. These resting points may be attached to ends of the support legs and may be abuttable against the chassis to support the chassis to create a resting surface in combination with the mounting points attached to ends of the rotating legs. The stand may include sliding mechanisms attached to and slideable along the support legs. The stand may include ratcheting stoppers attached to the support legs to prevent the sliding mechanisms from sliding beyond the stoppers. The cross-members may be attached to the sliding mechanisms at one end and may be attached to fixed mechanisms at another end to create a scissor mechanism that folds from an extended position into a collapsed position while keeping the support legs parallel or substantially parallel to one another. The stand may include a cross-link attached at one end to a respective support leg and attached at another end to a rotating leg. When in an extended position, the legs may form a ninety-degree or greater angle relative to the support legs.

In another example, a stand for supporting a laptop computer at an elevated position above a support surface may be provided. The laptop computer may include a chassis and screen pivotally coupled to a base by a hinge. The stand may include a frame including one or more gripping mechanisms that constrain the bottom edge of the chassis when the laptop is in an open position such that the one or more high-tack surfaces attached to support legs elevate the chassis and display above the support surface and the laptop computer is suspended from the chassis by the bottom edge of the chassis.

The one or more rotating legs may include a first rotating leg and a second rotating leg spaced apart from one another. An end portion of the first and second rotating legs may extend across a substantial portion of the width the laptop chassis bottom edge. The end portions of the first and second rotating legs may contain gripping mechanisms to restrain lateral and vertical movement of the laptop computer relative to the stand. The frame may include a first rotating leg coupled to the first support leg such that the first rotating leg is rotatable and translatable relative to the first support leg and a second rotating leg coupled to the second support leg such that the second leg is rotatable and translatable relative to the second support leg. The frame may include a first cross-link pivotally coupled to the first leg at one end and to the first display support leg at an opposing end. The frame may include a collapsible cross-frame structure positioned between and coupled to the first and second support legs.

In another example, a collapsible stand for use with a mobile computing device may be provided. The stand may include a first side-frame structure, a second side-frame structure, and a cross-frame structure positioned between the first and second side-frame structures. The cross-frame structure may be operably coupled to the first and second side-frame structures such that the first and second side-frame structures are oriented parallel or substantially parallel to one another during collapse of the stand from a fully-extended position to a fully-collapsed position.

The cross-frame structure may include a first pair of elongate, offset cross-frame members pivotally attached at a lower end to the first side-frame structure and pivotally attached at an upper end to the second side-frame structure, and a second pair of elongate, offset cross-frame members pivotally attached at an upper end to the first side-frame structure and pivotally attached at a lower end to the second side-frame structure. The first and second pairs of elongate, offset cross-frame members may be pivotally attached to one another intermediate their respective ends.

The upper ends of the first and second pairs of elongate, offset cross-frame members may be slideably attached to the first and second side-frame structures such that the upper ends of the first and second pairs of elongate, offset cross-frame members move away from the lower ends of the first and second pairs of elongate, offset cross-frame members, respectively, during collapse of the stand from the fully-extended position to the fully-collapsed position. When the stand is in the fully-extended position, the upper ends of the first and second pairs of elongate, offset cross-frame members may be lockable to the first and second side-frame structures to prevent or substantially prevent the upper ends of the first and second pairs of elongate, offset cross-frame members from moving relative to the lower ends of the first and second pairs of elongate, offset cross-frame members, respectively.

The first and second side-frame structures each may include an elongate leg and a leg attached to the elongate leg such that the leg rotates and slides relative to the elongate leg. The first and second side-frame structures each may include a cross-link pivotally attached at one end to the elongate leg and pivotally attached at another end to the leg. The first and second side-frame structures each may include a ratcheting stop attached to the elongate leg to prevent the leg from moving beyond the stop. Activation of a trigger mechanism may allow the rotating leg to move past the stop. The leg may intersect the elongate leg at a position between the stop and a respective upper end of the first and second pairs of elongate, offset cross-frame members.

This summary of the disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of examples, it should be appreciated that individual aspects or features of any example can be claimed separately or in combination with aspects and features of that example or any other example.

This summary is neither intended nor should it be construed as being representative of the full extent and scope of the present disclosure. The present disclosure is set forth in various levels of detail in this application and no limitation as to the scope of the claimed subject matter is intended by either the inclusion or non-inclusion of elements, components, or the like in this summary.

BRIEF DESCRIPTION OF THE DRAWINGS

The accompanying drawings, which are incorporated in and constitute a part of the specification, illustrate examples of the disclosure and, together with the general description given above and the detailed description given below, serve to explain the principles of these examples.

It should be understood that the drawings are not necessarily to scale. In certain instances, details that are not necessary for an understanding of the disclosure or that render other details difficult to perceive may have been omitted. In the appended drawings, similar components and/or features may have the same reference label. It should be understood that the claimed subject matter is not necessarily limited to the particular examples or arrangements illustrated herein.

DETAILED DESCRIPTION

The present disclosure generally describes a stand for use in positioning a computing device, such as a laptop computer, at an elevated position relative to a support surface, such as an upper surface of a desk or table. When used in association with a laptop computer, the stand may position the laptop screen at a height above a support surface such that the screen is at or near eye level of a user. When supported on the stand, the laptop screen may be positioned at a height that is higher than can be achieved if the laptop were to rest by itself on the support surface.

The stand may be attached to the front-edge of chassis, base, or a combination of the chassis and base of the laptop computer. In some implementations, the stand attaches to a base portion of the chassis and the laptop computer is constrained from this attachment point. The attachment point may be below and in front the center of mass of the laptop computer, thereby creating a rotation force acting on a gripping mechanism increasing binding grip to produce an inherently more stable method of holding the laptop computer than traditional "easel" style stands in which the laptop chassis rests on a surface of the stand.

The stand may be collapsible to provide users with a portable stand that may be used in remote locations away from a user's home or office. The portable nature of the stand may allow users to maintain an ergonomically correct working position and minimize repetitive use injuries from computer use while working remotely. The stand may include structural cross-members designed to allow a user to expand or extend the collapsible stand in a single motion and to collapse the stand in a similar, but reverse motion, resulting in an easily packable stand.

Figure 1:
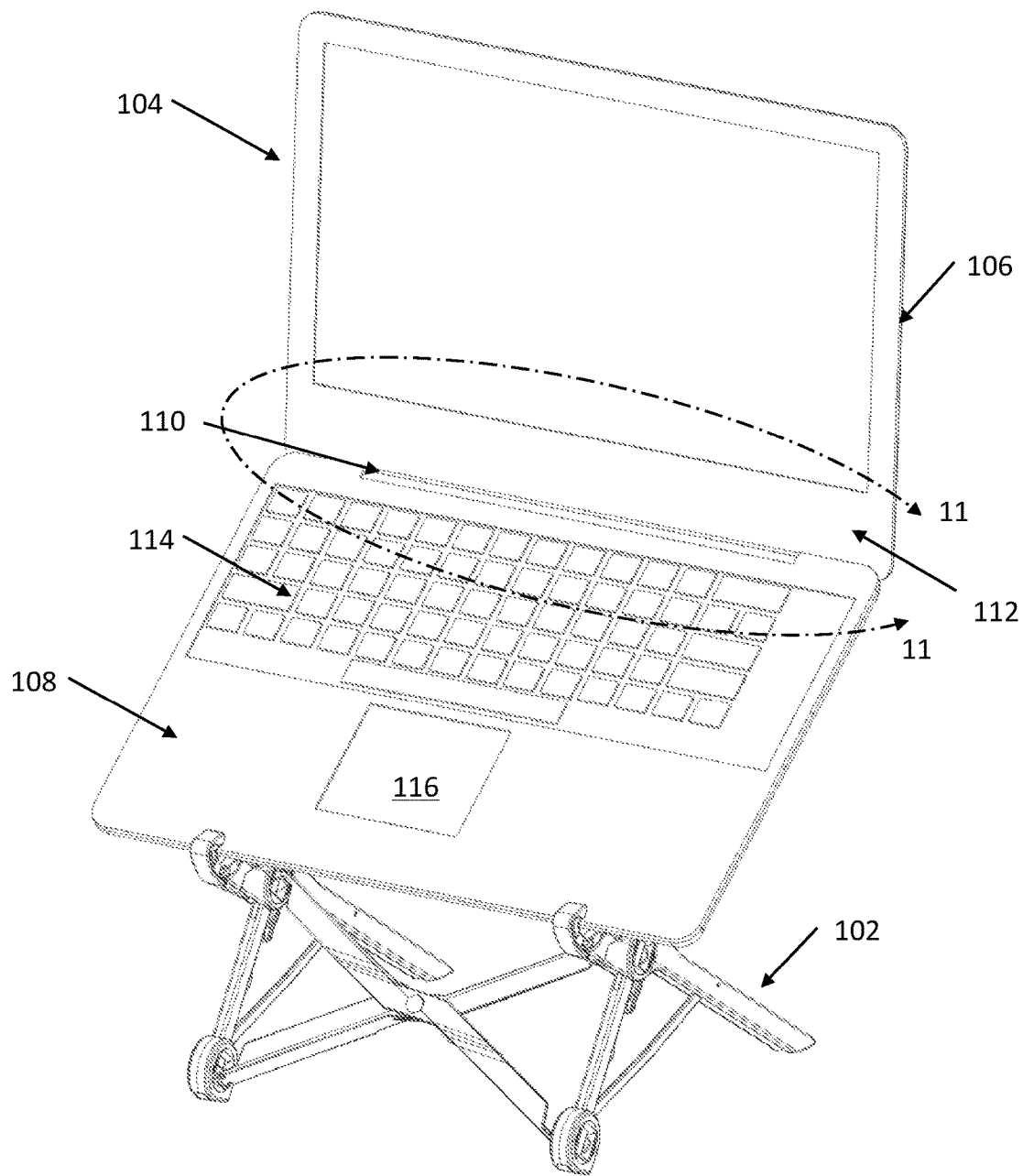
FIG. 1 is a front isometric view of a laptop computer mounted onto an example stand.

FIG. 1 is a front isometric view of an example stand 102 positioning a laptop computer 104 at an elevated position. The laptop computer 104 includes a screen 106 pivotally coupled to a base 108 by a hinge 110. The laptop computer 104 may be supported on the stand 102 in an open position in which the screen 106 is pivoted away from the base 108 such that an inner face 112 of the screen 106 and a keyboard 114 and track pad 116 of the base 108 are visible. The stand 102 may support the screen 106 above a support surface 118 (see FIG. 8A), such as an upper surface of a desk or table, such that the screen 106 is near or at an eye level of a user. The stand 102 may be referred to as a computer accessory or a support structure. The screen 106 may be referred to as a display or monitor. The base 108 may be referred to as a chassis.

Figure 2:
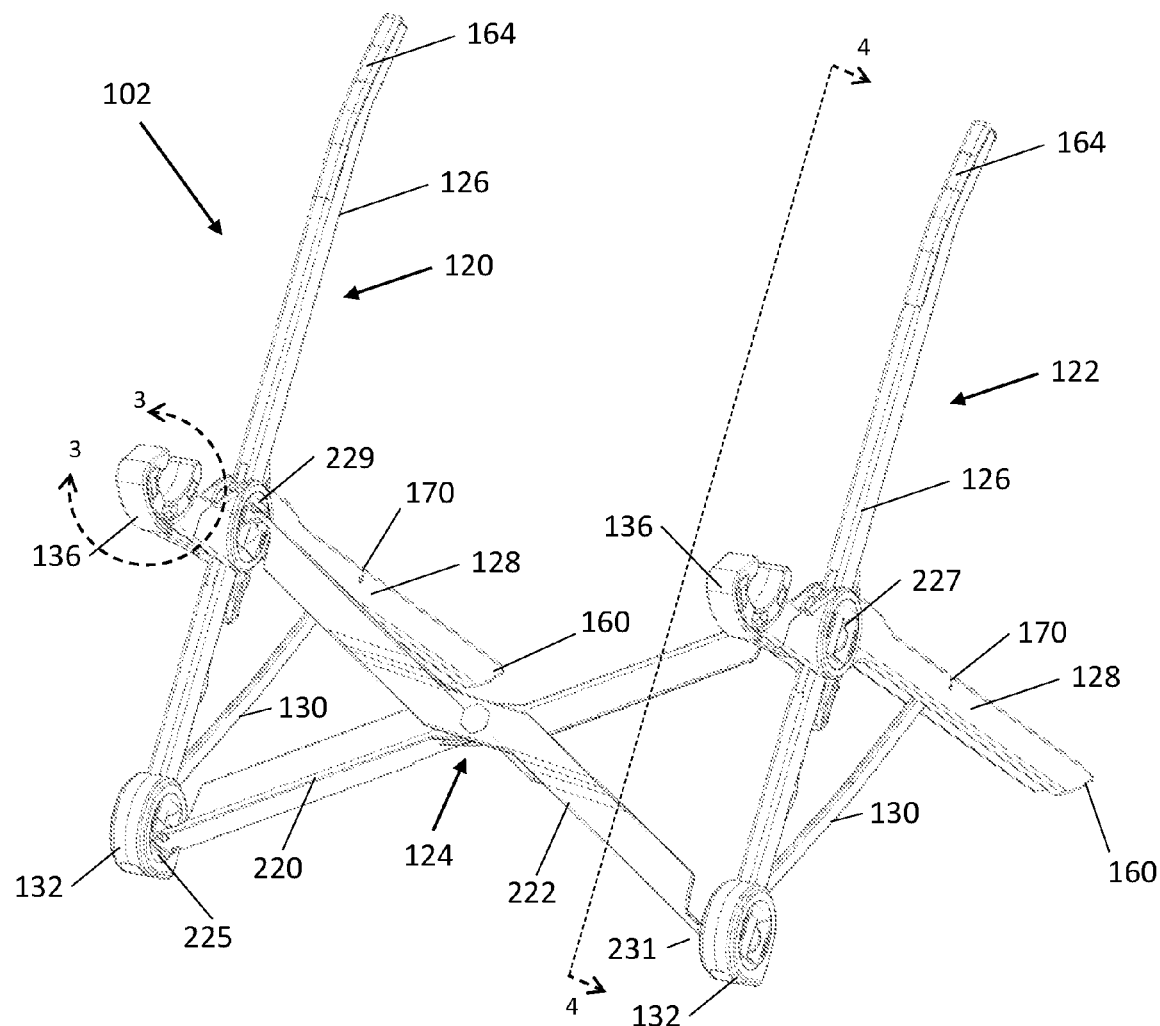
FIG. 2 is an isometric view of the stand illustrated in FIG. 1.
Figure 18:
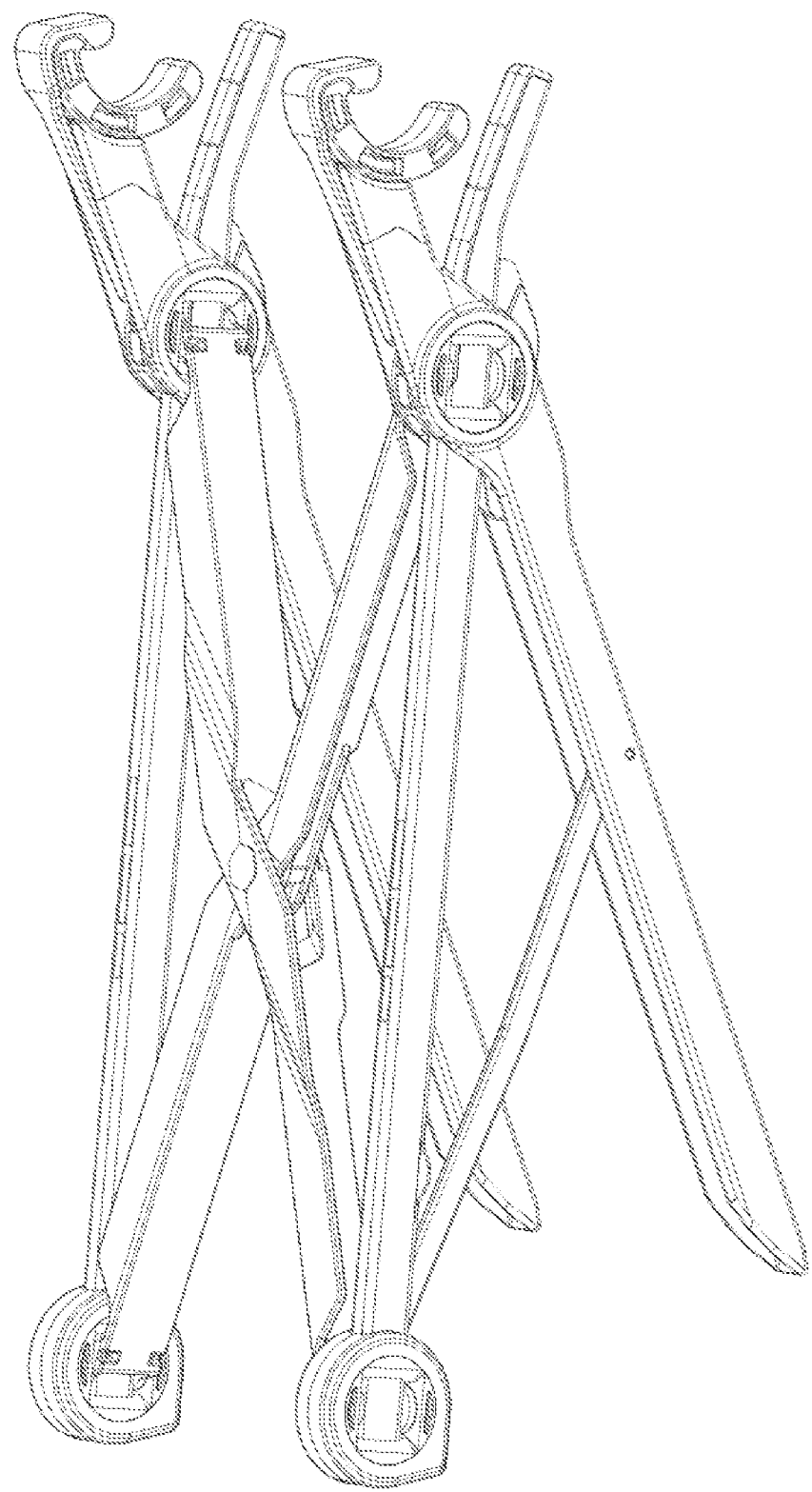
FIG. 18 is a front isometric view of the stand illustrated in FIG. 1 in a partially-collapsed position.

FIG. 2 is an isometric view of the stand 102 illustrated in FIG. 1. As shown in FIG. 2, the stand 102 may include outside or opposing side-frame structures 120, 122 offset from and attached to one another by a cross-frame structure 124 to create a self-standing support structure. The cross-frame structure 124 may be positioned between the opposing, first and second side-frame structures 120, 122. The cross-frame structure 124 may be operably coupled to the opposing side-frame structures 120, 122 to maintain the side-frame structures 120, 122 in parallel or substantially parallel relationship relative to one another during collapse of the stand 102 from a fully-extended position (see FIGS. 1, 2, 5-8, and 15), through a partially-collapsed position (see FIG. 18), and into a fully-collapsed position (see FIG. 20).

Each of the side-frame structures 120, 122 may include an elongate leg 126 and a rotating leg 128 attached to the elongate leg 126 to stabilize the leg 126 in an upwardly-extending position. The side-frame structures 120, 122 may each include a cross-link 130 extending between a respective elongate leg 126 and rotating leg 128. The cross-link 130 may be pivotally attached at one end to a respective elongate leg 126 and pivotally attached at an opposing end to a respective rotating leg 128. When the stand 102 is in a fully-collapsed position (see FIG. 20), the elongate legs 126 may be received in the space inside the respective rotating legs 128 and the cross-links 130 may be received in the space inside the respective elongate legs 126 to provide a more compact, collapsed stand 102. The elongate legs 126 may be referred to as first and second elongate frame members or display support legs, and the legs 128 may be referred to as third and fourth elongate frame members or rotating legs.

Figure 6:
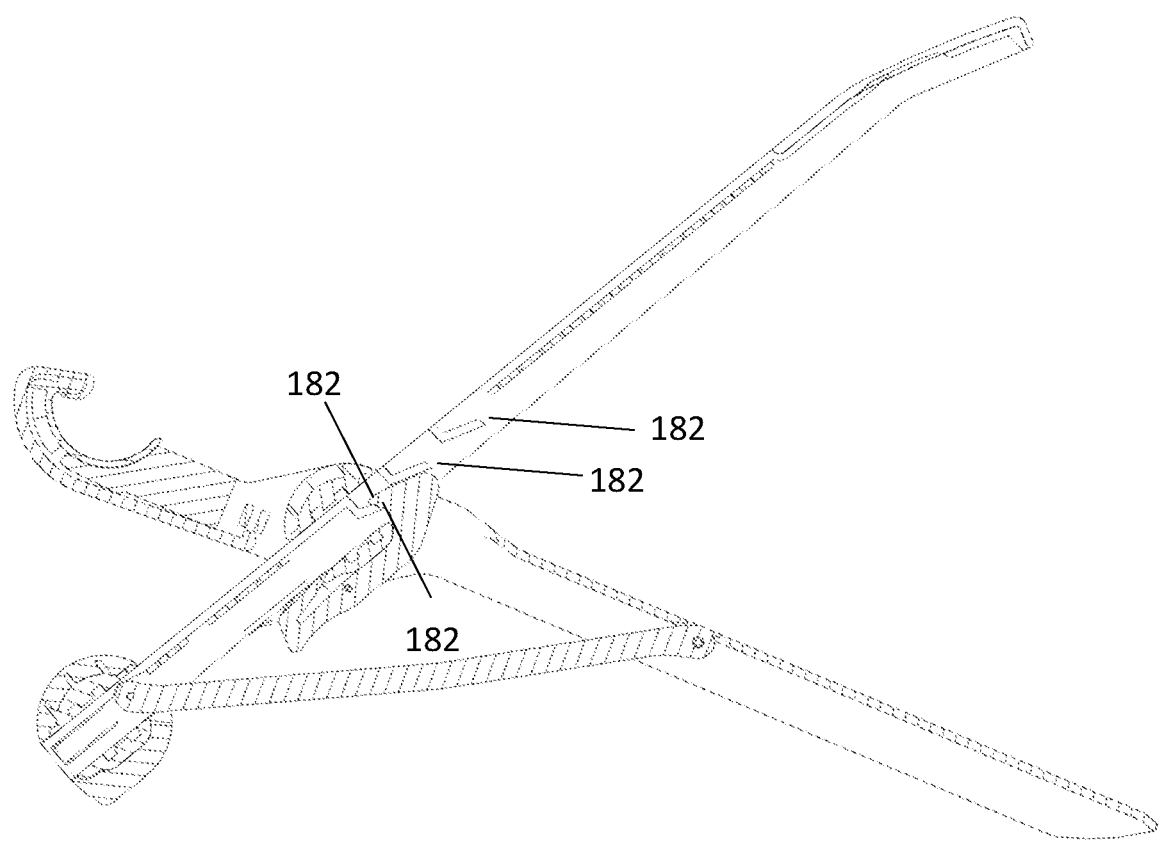
FIG. 6 is an enlarged, detail view of a height adjustment feature of the stand illustrated in FIG. 1 taken along line 4-4 as shown in FIG. 2 and shown in lowest position of height adjustment feature.
Figure 15:
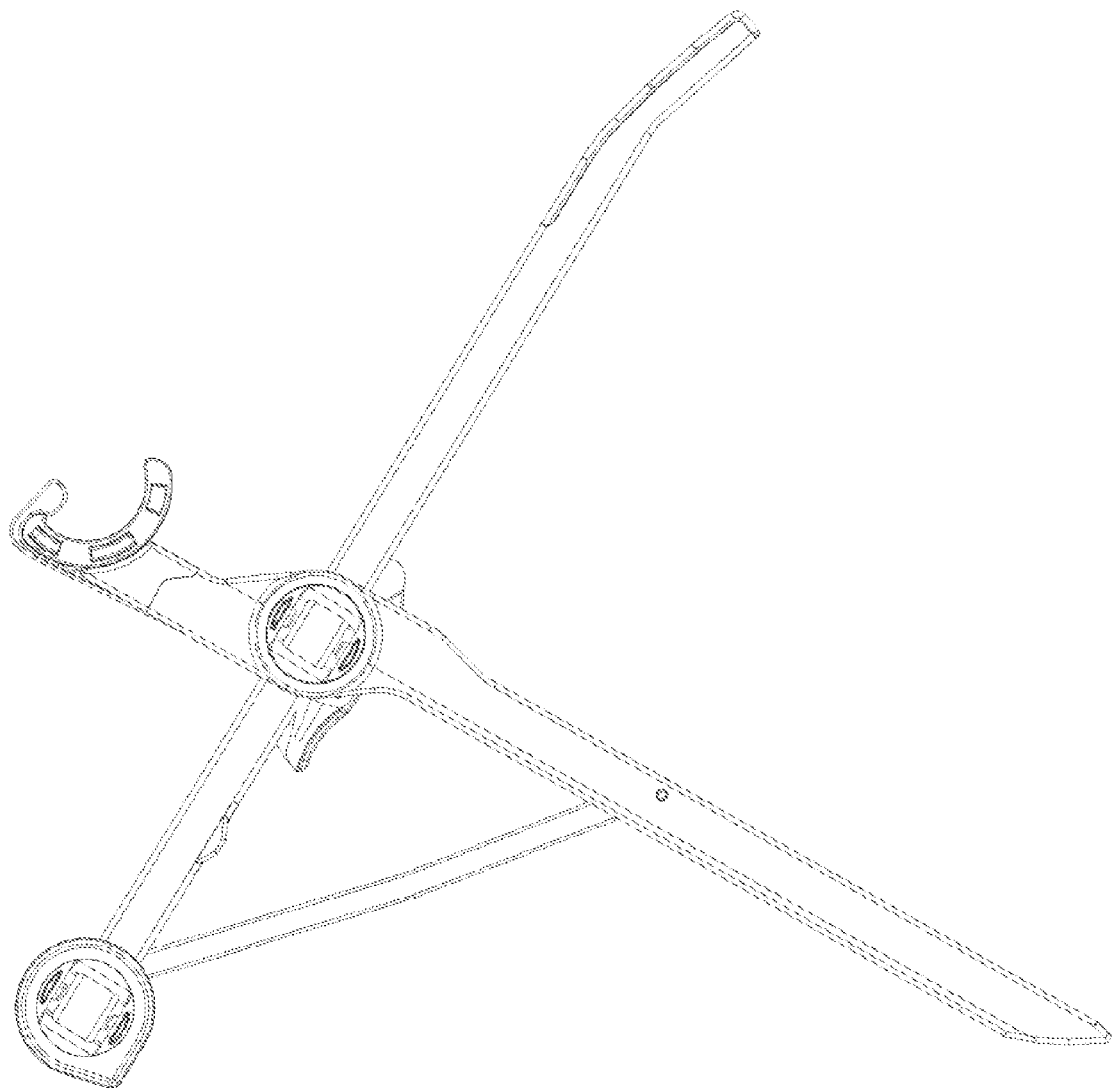
FIG. 15 is a right-side elevation view of the stand illustrated in FIG. 1 in a fully-expanded position.

With reference to FIGS. 5 and 6, when the stand 102 is in a fully-extended position, the elongate legs 126 of the side-frame structures 120, 122 may be positioned in parallel, offset planes as viewed from a front-elevation, rear-elevation, top-plan, or bottom-plan viewpoint. With reference to FIGS. 8 and 15, when the stand 102 is in a fully-extended position, the elongate legs 126 may extend upwardly and rearwardly from the support surface 118 (see FIG. 8) in a common, inclined plane as viewed from a side-elevation viewpoint. As shown in FIGS. 1, 2, 5-8, 15, and 18-20, the elongate legs 126 may remain in these planes during collapse of the stand 102 from the fully-extended position to the fully-collapsed position.

With reference to FIGS. 2, 5-8, and 15, a foot structure 132 may be attached to a lower end of each elongate leg 126. In some implementations, each elongate leg 126 is fixedly secured to the foot structure 132 such that the foot structure 132 is not movable relative to the elongate leg 126. Each foot structure 132 may include a grip element to restrain slippage of the foot structures 132, and thus the stand 102, relative to the support surface 118.

Figure 3A:
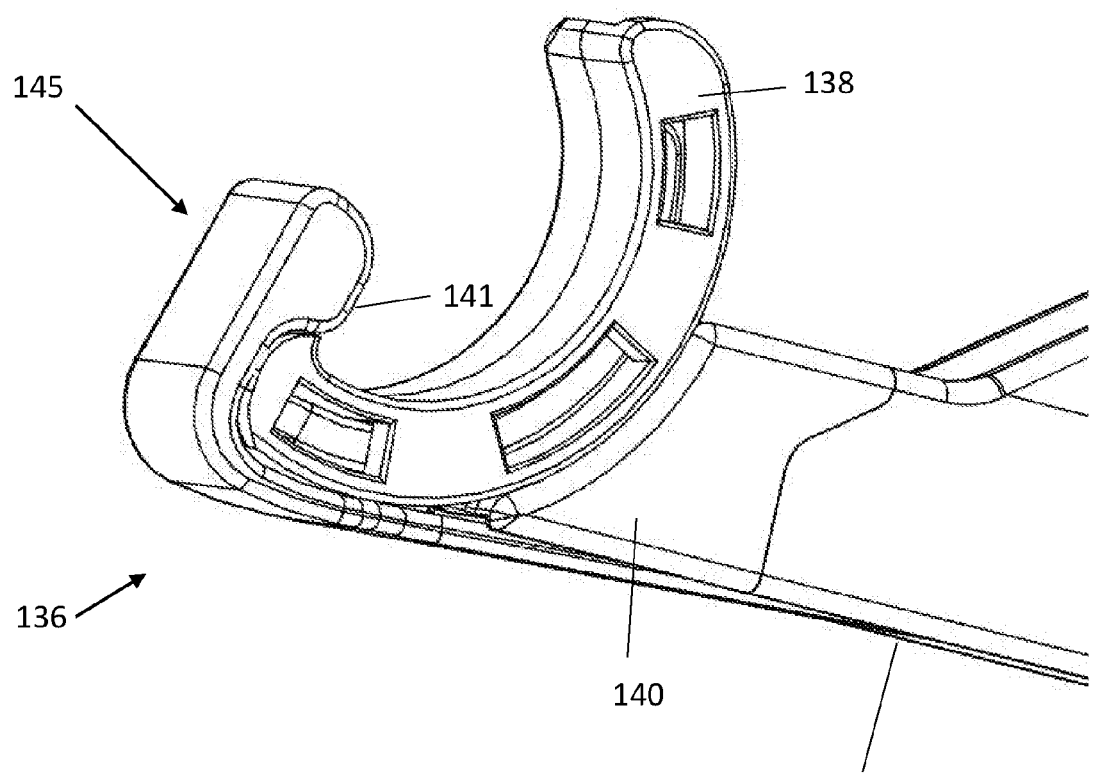
FIG. 3A is an enlarged, detail view of a gripping mechanism feature of the stand illustrated in FIG. 1 taken along line 3-3 as shown in FIG. 2.
Figure 3B:
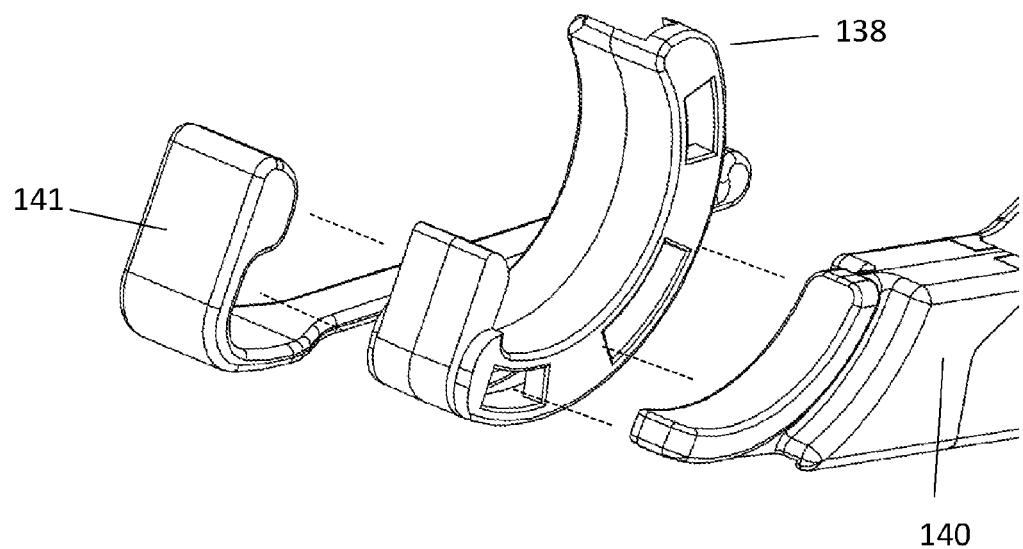
FIG. 3B is an enlarged, exploded, detail view of a gripping mechanism feature of the stand illustrated in FIG. 1 taken along line 3-3 as shown in FIG. 2.
Figure 3C:
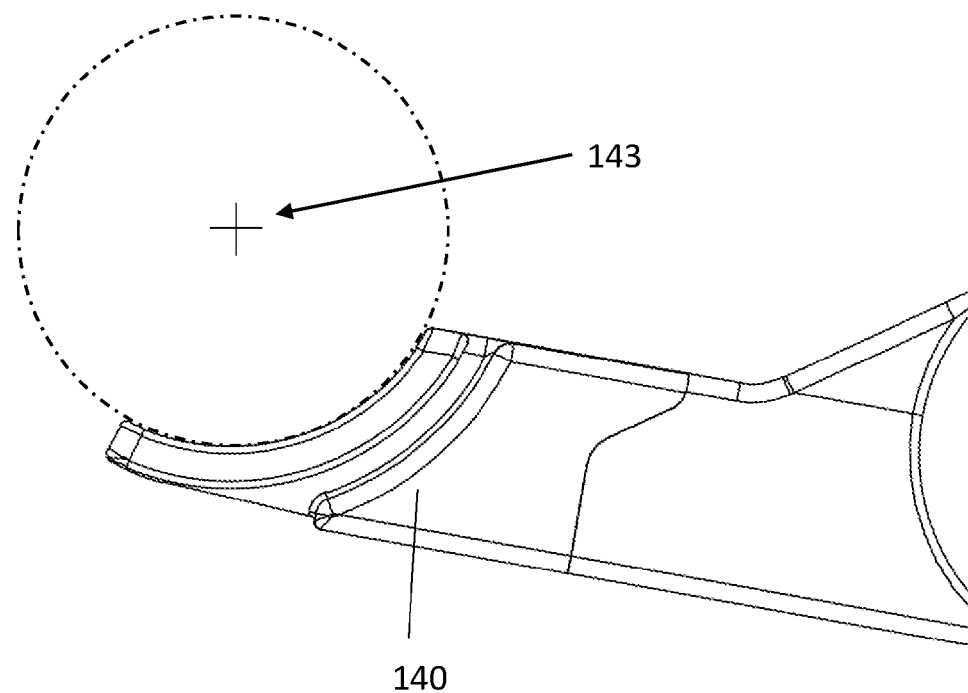
FIG. 3C is a right-side detailed view of a gripping mechanism feature.
Figure 3D:
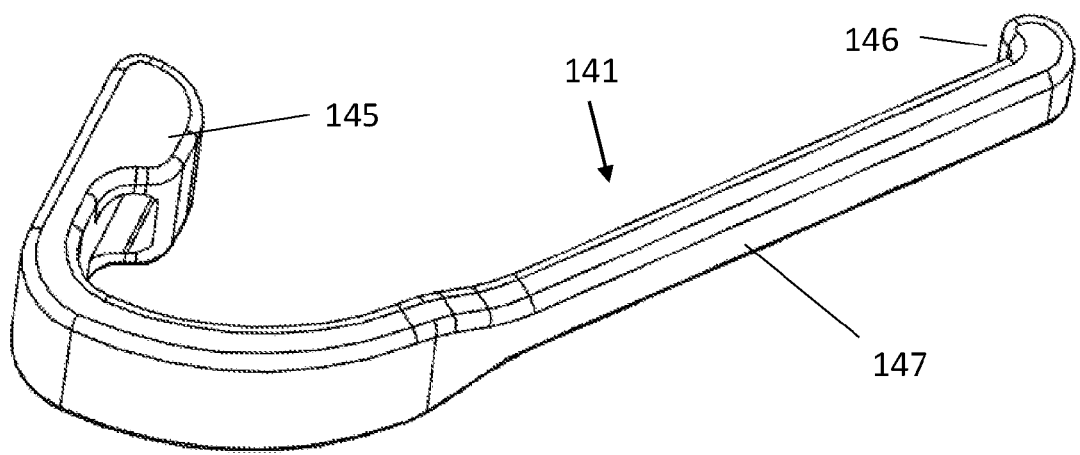
FIG. 3D is a lower elevation view of an elastic band with grip surface that is part of a gripping mechanism feature.
Figure 4:
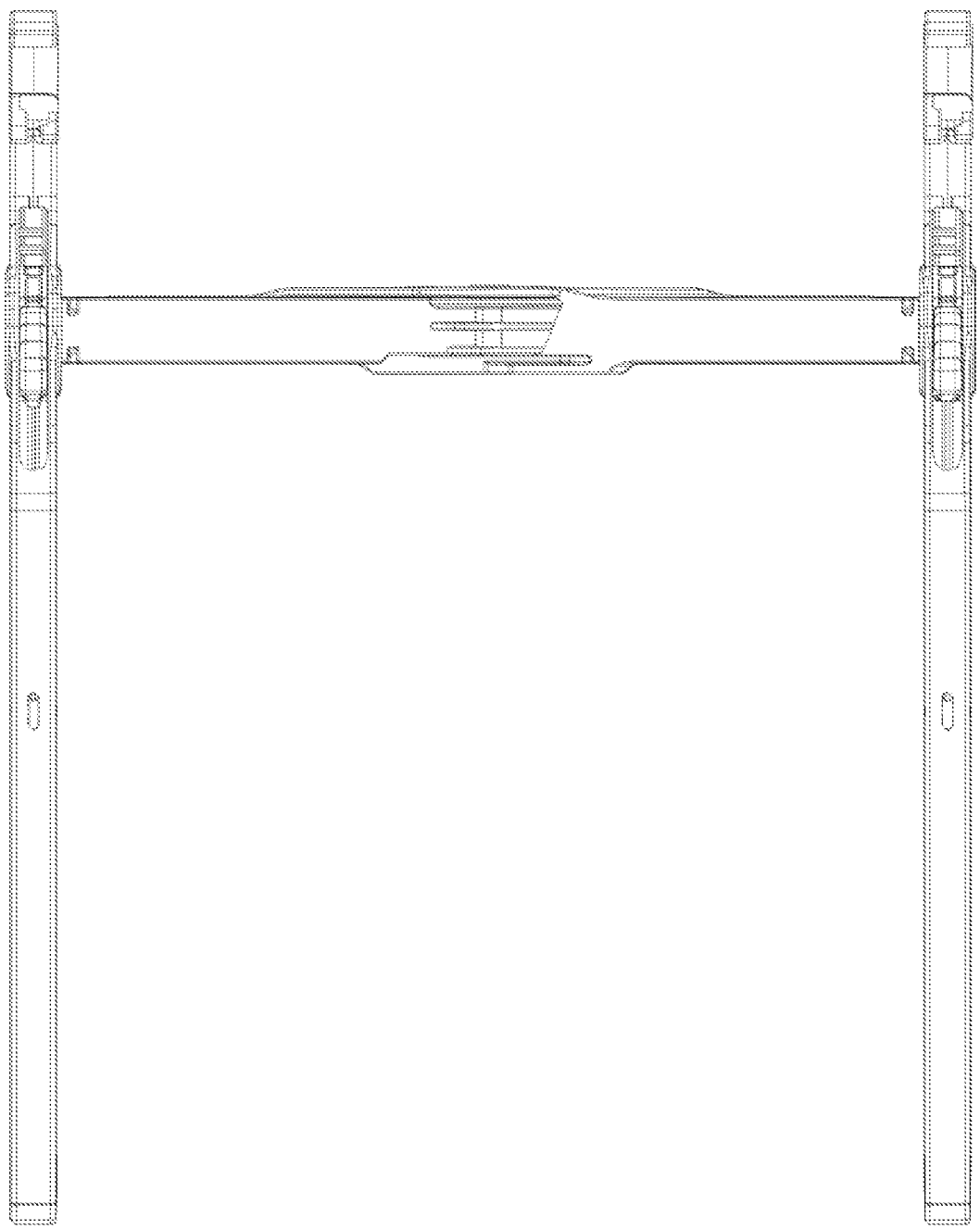
FIG. 4 is a top, rear view of the stand illustrated in FIG. 1
Figures 5A, 5B, 5C:
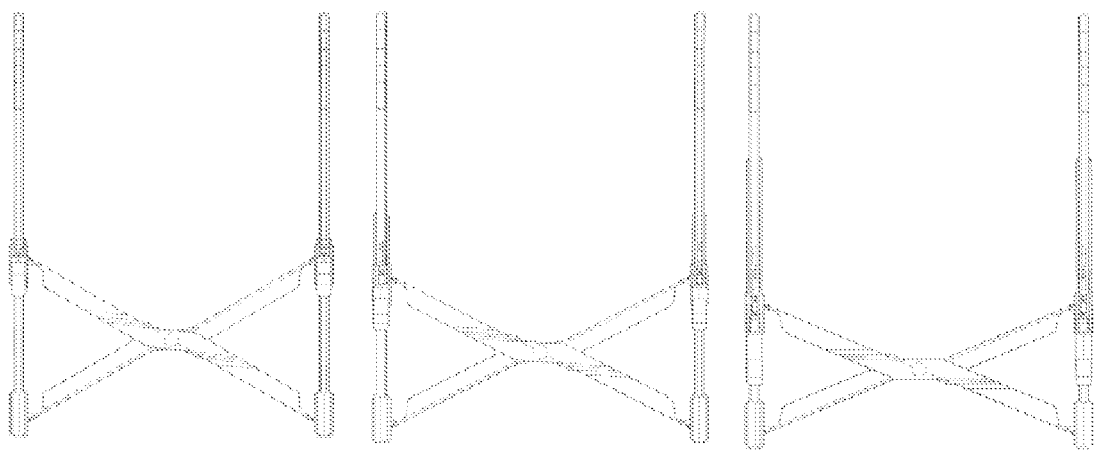
FIG. 5A is a front elevation view of the stand illustrated in FIG. 1 shown in highest position of height adjustment feature.
FIG. 5B is a front elevation view of the stand illustrated in FIG. 1 shown in mid position of height adjustment feature.
FIG. 5C is a front elevation view of the stand illustrated in FIG. 1 shown in lowest position of height adjustment feature.

With continued reference to FIGS. 2, 3A-3D, 5A-8C, and 15, a gripping mechanism 136 may be attached to the front-end of each rotating leg 128. With specific reference to FIGS. 3A, 3B, 3C, each gripping mechanism 136 may include a rotating member 138 (referred to hereinafter as a "rotating clamp" without intent to limit), a track 140 (referred to hereinafter as a "circumferential track" without intent to limit), and an elastic member 141 (referred to hereinafter as an "elastic band with a grip surface" without intent to limit). The elastic band with grip surface 141 may be composed of an elastic boot 145, an elastic band 147, and a mechanical attachment point 146. With reference to FIG. 3C, the circumferential track 140 creates a circular track for rotating clamp 138 combined with matching circular track on rotating clamp 138 that allows rotating clamp 138 to pivot around theoretical center point 143 of circular track. Elastic band with grip surface 141 may be mechanically attached to free end of rotating clamp 138 by elastic boot 145 that is a feature of elastic band with grip surface 141. The opposite end of elastic band with grip surface 141 may be mechanically attached to opposite end and in tangential orientation of circumferential track 140 at via mechanical attachment point 146. Tension force may be created by rotating the rotating clamp 138 in direction that expands the elastic band 147 of the elastic band with grip surface 141. The tension force created may act tangentially to the circular track created around theoretical center point 143 and act to return the rotating clamp 138 to starting position.

Figure 8A:
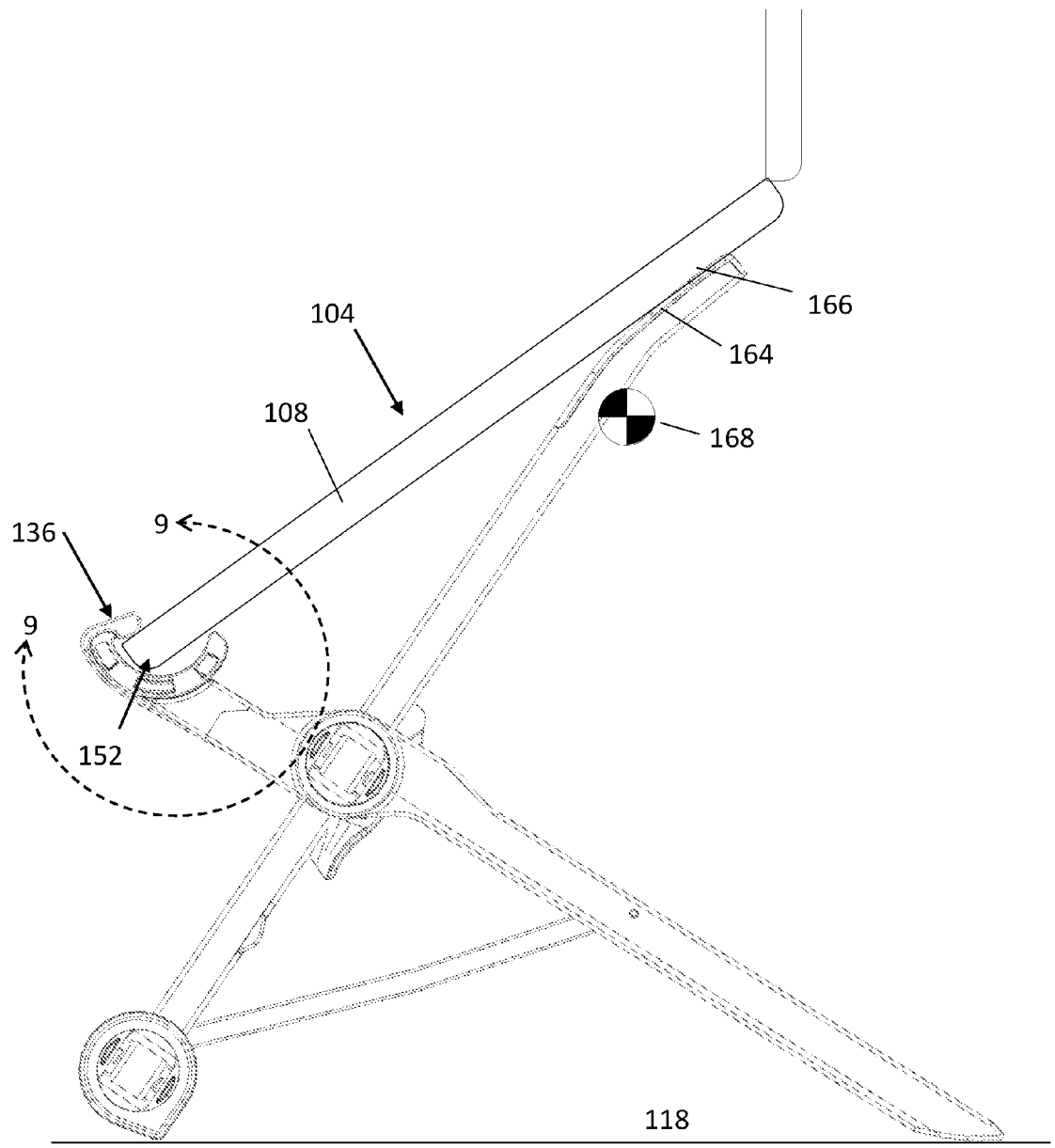
FIG. 8A is a right-side elevation view of the stand illustrated in FIG. 1 in a fully-expanded position.
Figure 8B:
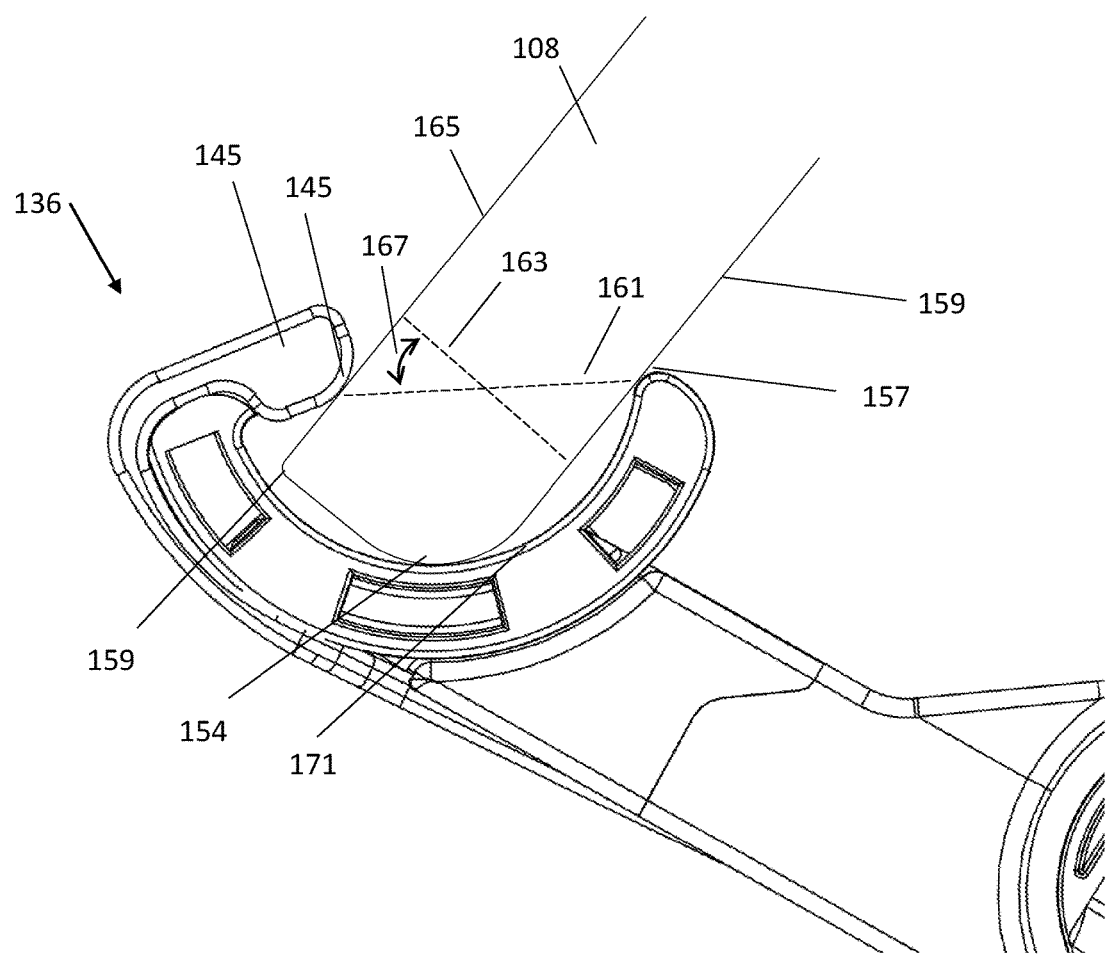
FIG. 8B is a right-side detailed view of the gripping mechanism and laptop computer.
Figure 9:
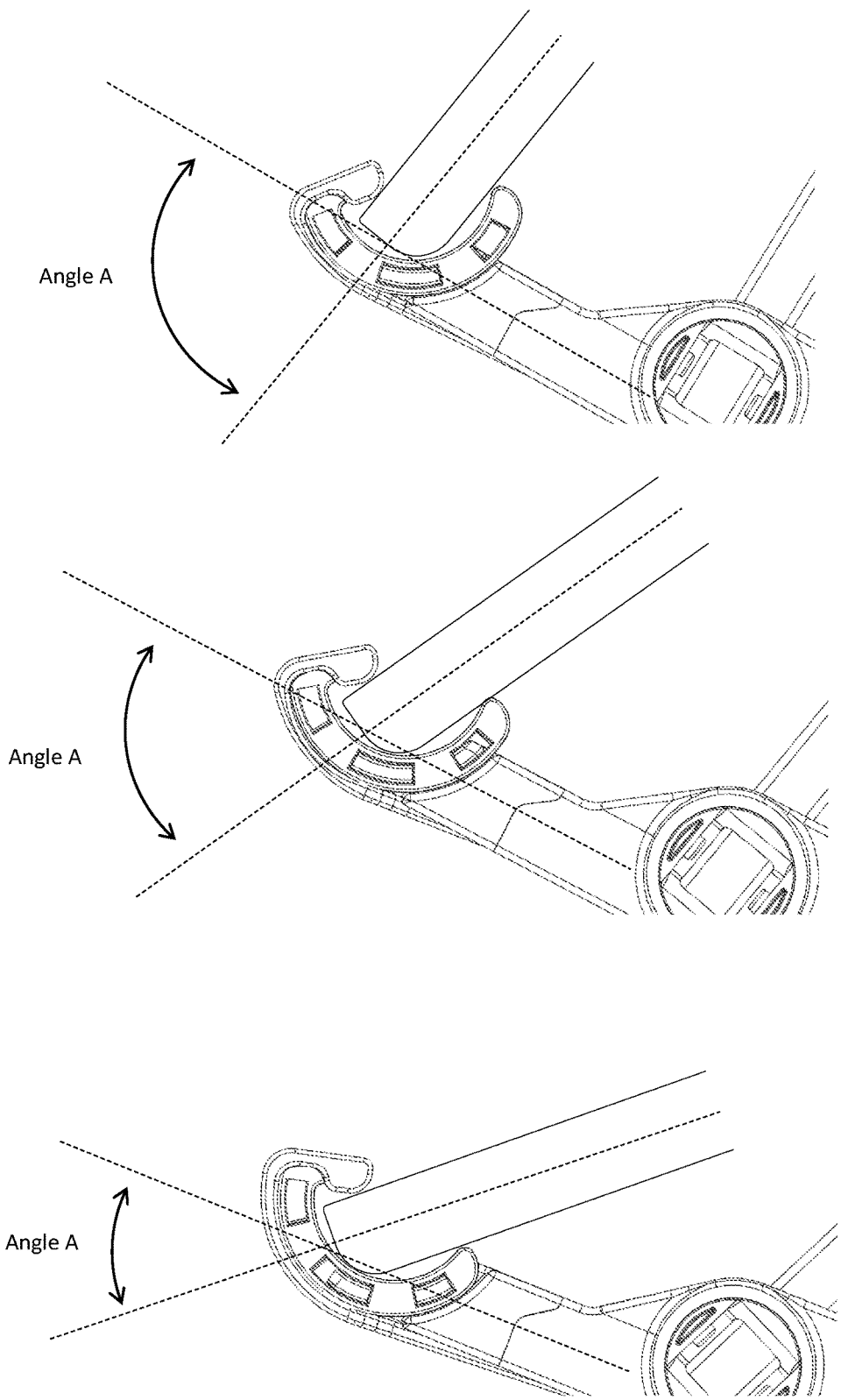
FIG. 9 is an enlarged, detail, 3-series view of a gripping mechanism of the stand supporting a display of the laptop computer illustrated in FIG. 1 taken along line 9-9 as shown in FIG. 8A. The dashed lines show the centerlines of the laptop chassis and rotating leg. The 3-series show the range of motion the laptop may go through during height adjustment of the laptop stand. Angle A, the angle between the laptop chassis and the rotating arm, is shown across all 3 configurations.

With reference to FIGS. 8A, 8B, and 9, the gripping mechanism 136 may support the laptop computer 104 along a lower-edge portion 152 of the chassis 108 such that the chassis 108 of the laptop may be supported from the lower-edge portion 152. With specific reference to FIGS. 8A, 8B, and 9, the gripping mechanism 136 may abut against the lower face 157 and a lower, peripheral edge 154 of the chassis 108 to restrain movement of the laptop 104 relative to the stand 102. The elastic boot 145 may also act as a gripping surface, providing a point of contact to top surface of laptop chassis 108. The contact point 157 of rotating clamp 138 may contact the bottom surface of laptop chassis 108 and the 3 contact points 145, 154, 157 created by rotating clamp 138 may form rigid clamping body. Slippage of contact point 145 over top front edge of laptop chassis 159 is prevented by angle 167 between theoretical line 161 between contact points 145 and 157 and line normal 163 to top surface 165 of laptop chassis 108 being greater than 0 degrees. Elastic tension created by rotating the rotating clamp 138 to accommodate laptop chassis 108 increases the force applied through elastic boot, providing additional restrain of movement of the laptop 104 relative to the stand 102. FIG. 9 is an enlarged, detail, 3-series view of a gripping mechanism of the stand supporting a display of the laptop computer illustrated in FIG. 1 taken along line 9-9 as shown in FIG. 8A. The dashed lines in FIG. 9 show the centerlines of the laptop chassis and rotating leg. The 3-series show the range of motion the laptop may go through during height adjustment of the laptop stand. Angle A, the angle between the laptop chassis and the rotating arm, is shown across all 3 configurations.

With reference to FIG. 2, a foot structure 160 may be attached to a lower end of each rotating leg 128. Each foot structure 160 may include a grip element to restrain slippage of the foot structures 160 relative to the support surface 118. As shown in FIG. 2, when the stand 102 is in a fully extended position, the foot structures 132, 160 may be spaced apart from one another to provide a broad base with four support surface contact points to prevent or substantially prevent the stand 102 from tipping over when a laptop 104 is mounted onto the stand 102.

Figure 8C:
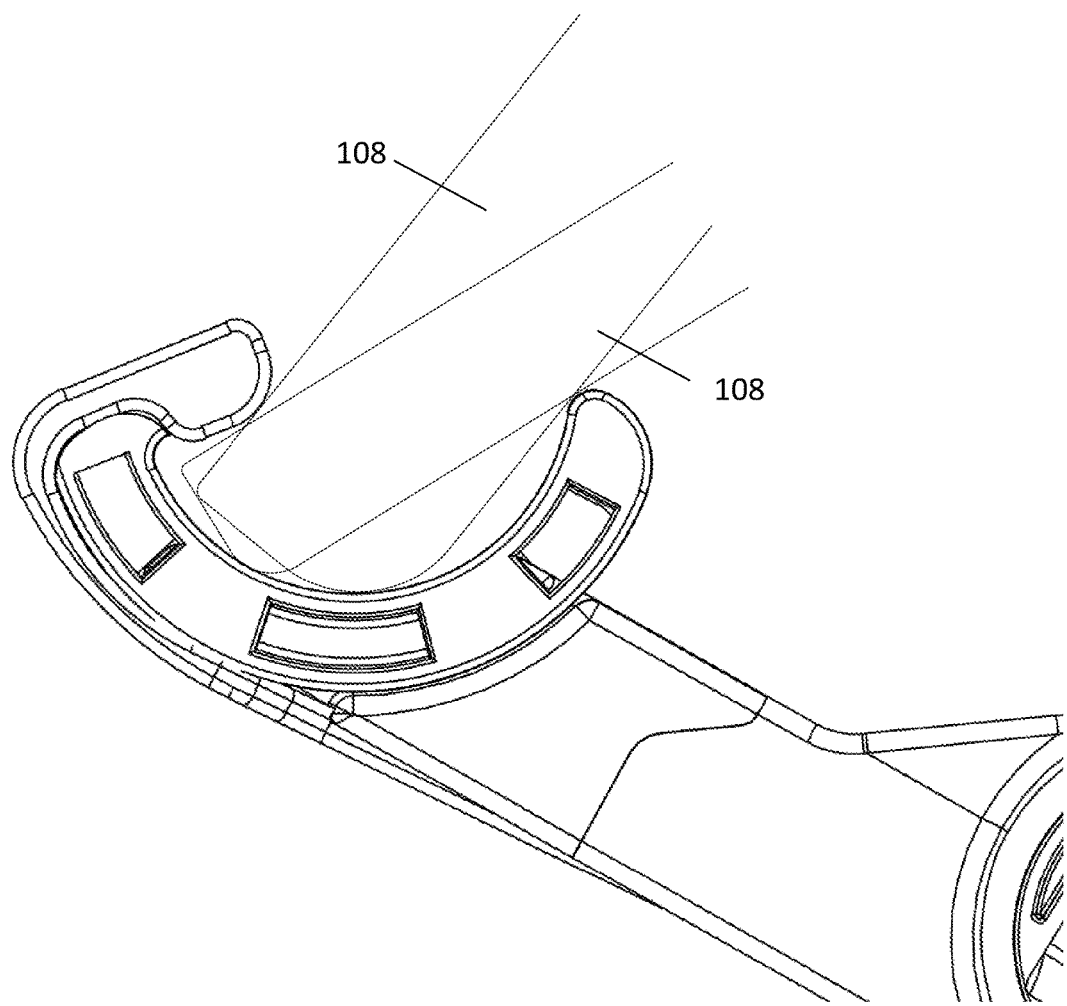
FIG. 8C is a right-side detailed view of the gripping mechanism and laptop computer.

With reference to FIGS. 2, 8A, 8B, and 8C, an upper end of each leg 128 may include a chassis abutment surface 164 that may abut against a rear or bottom surface 166 of the chassis 108 when the stand 102 is in the fully-extended position and the laptop 104 is supported from the gripping mechanism 136. In the suspended position (see FIG. 8A), the center of gravity 168 of the laptop 104 may be located rearward the gripping mechanism 136, thereby creating a pendulum effect in which the base 108 of the laptop 104 pivots about the gripping mechanism 136 in a rearwardly arcuate motion until the bottom surface 166 of the chassis 108 abuts or rests against the chassis abutment surfaces 164. In this suspended position, the elastic boot 145 of the rotating clamp 138 may abut against the top edge of the chassis 108 and contact point 157 of rotating clamp 138 may abut against the lower face 159 of the chassis 108 and inside surface 171 of rotating clamp 138 may abut against the lower edge 154 of the chassis 108 to support the laptop 104 from the gripping mechanism 136 and the center of gravity 168 of the laptop 104 may provide a force in a rearwardly direction from the gripping mechanism 136 to maintain the abutting engagement of the rotating clamp 138 and laptop chassis 108. As shown in FIG. 8C, the stand 102 may accommodate various chassis shapes and thickness and angles of rotation of rotating clamp 138, as represented by the dashed-line representation of a various chassis 108.

Figures 7A, 7B:
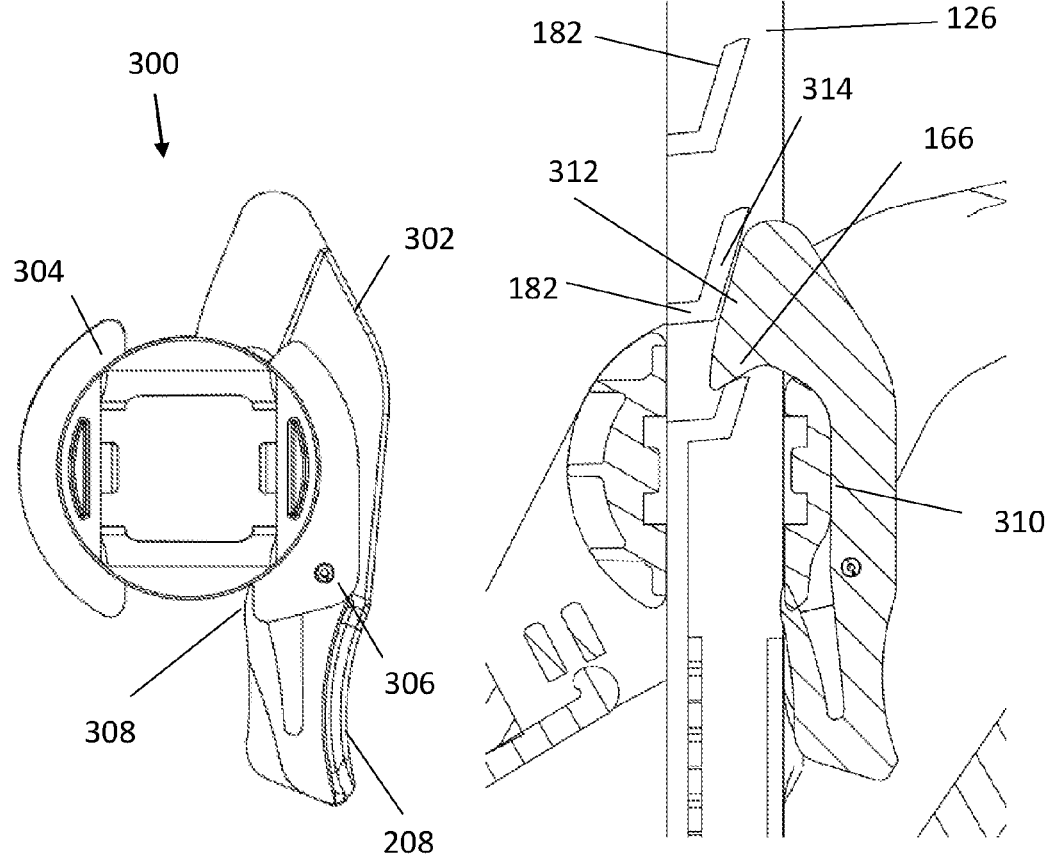
FIG. 7A is a profile view of a ratchet mechanism feature of the stand illustrated in FIG. 1.
FIG. 7B is a cutaway view of a ratchet mechanism of the stand illustrated in FIG. 1.
Figure 7C:
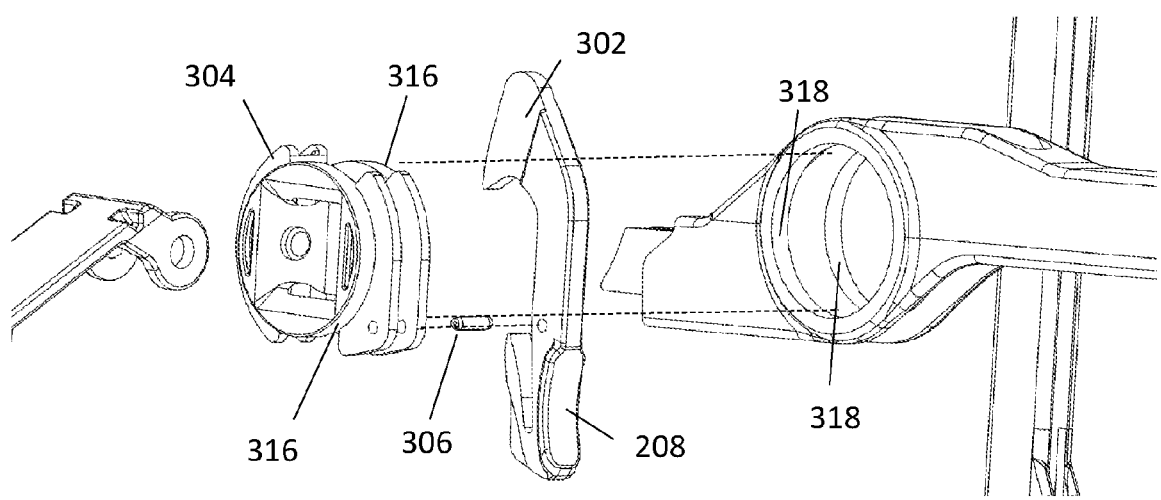
FIG. 7C is an exploded view of a ratchet mechanism of the stand illustrated in FIG. 1.

With references to FIGS. 7A, 7B, and 7C, the ratchet mechanism 300 consists of ratchet trigger 302 and slider bearing 304 and pin 306. Pin 306 constrains ratchet trigger 302 in slider bearing 304. Ratchet spring 308 may be part of ratchet trigger 302 and may be in a compressed initial state while ratchet trigger 302 is installed in slider bearing 304. Pass-through in slider bearing 304 for accepting support leg 126 constrains movement of ratchet mechanism 300 to one translational degree of freedom and restrain movement about the other five degrees of freedom (two translation degrees of freedom and three rotational degrees of freedom) along length of support leg 126. In FIG. 7B cutaway view of FIG. 7A, compressed ratchet spring 308 may provide rotational force opposite ratchet hook 166 end of ratchet spring 308, keeping ratchet hook 166 end of ratchet spring pressed flush against abutment surface 310 of slider bearing. Rotational displacement of ratchet hook 166 around pin 306 in direction opposite of rotation from abutment surface 310 will be counteracted by ratchet spring 308. Rotational displacement of ratchet trigger 302 may be provided by horizontal displacement of slip surface 312 of ratchet trigger 302 by slip surface 314 of stop 182. Arrangement of ratchet trigger 302 and slip surfaces 314 of stops 182 may be configured in an arrangement that restricts movement in the downward direct, but allows movement in the upward direction. The arrangement may allow for user of ratchet trigger 302 to progress the vertical height of ratchet mechanism 302 in the downward direction by compressing ratchet spring 308 to allow ratchet hook 310 to pass by stop 182 to allow downward progression to the next stop 182.

In the exploded view of FIG. 7C, cylindrical bearing seats 316 of slider bearing 304 of ratchet mechanism 300 are seated into bearing track race 318 of rotating leg 128. Assembly of ratchet mechanism 300 into rotating leg 128 may allow for only one rotational degree of freedom and restrain movement about the other five degrees of freedom (three translation degrees of freedom and two rotational degrees of freedom) of ratchet mechanism 300 within rotating leg 128.

Figure 16A:
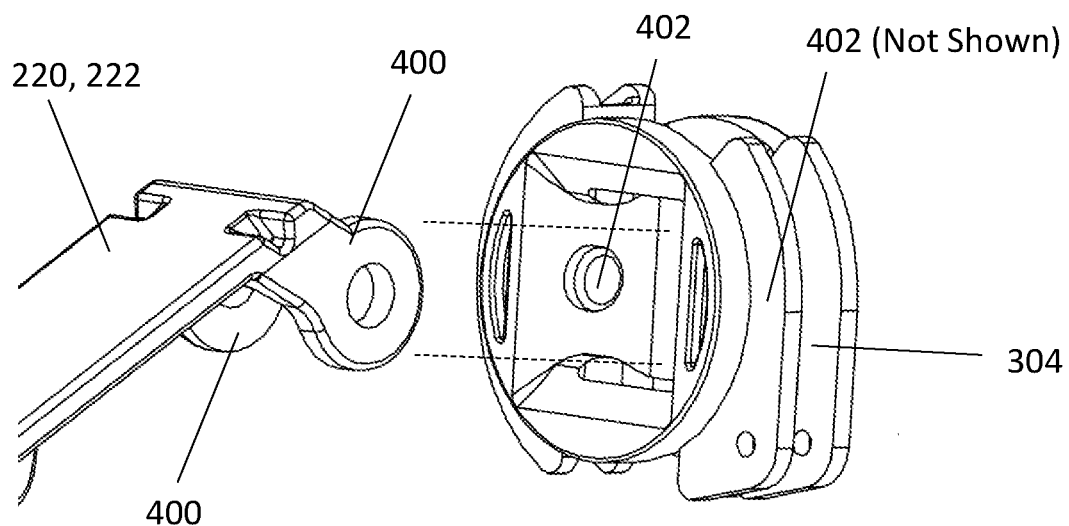
FIG. 16A is an exploded view of cross member and slider bearing assembly.
Figure 16B:
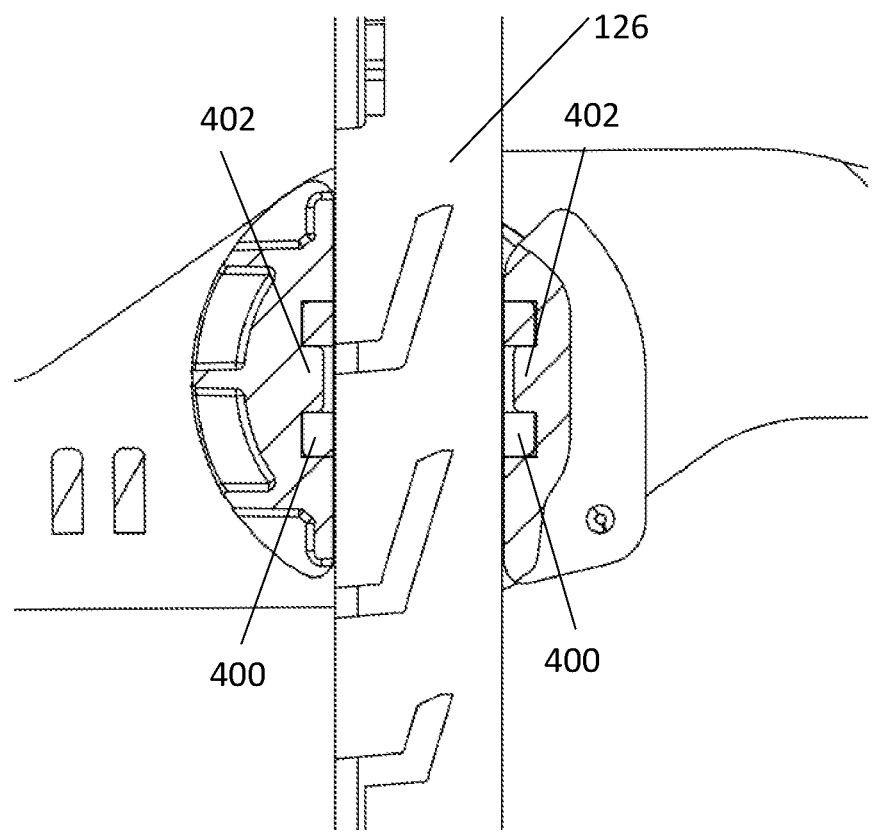
FIG. 16B is a cross-section view of cross member and slider bearing assembly.
Figure 17:
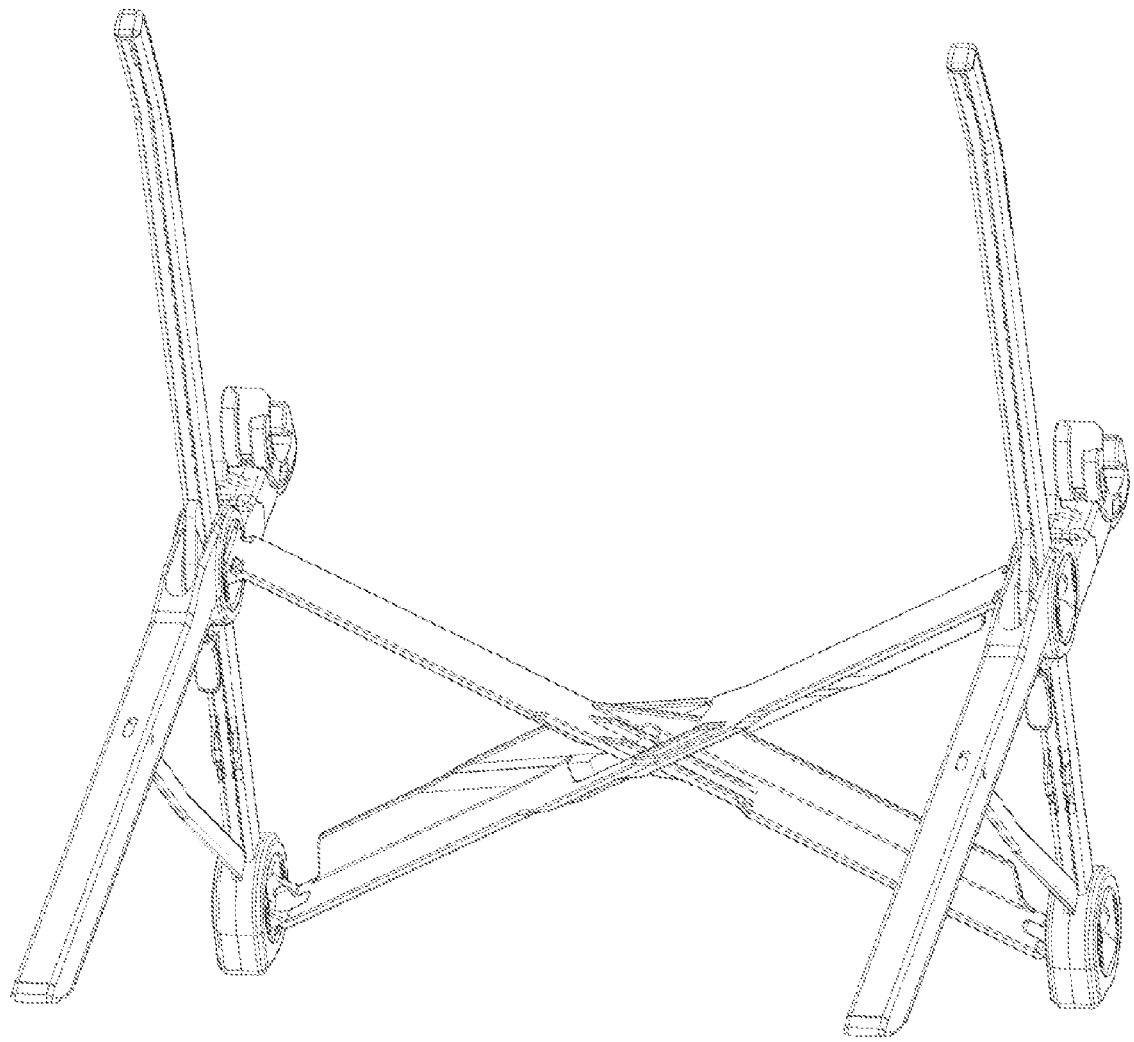
FIG. 17 is a rear isometric view of the stand illustrated in FIG. 1.

In FIG. 16A, 16B, pivot flanges 400 of the first and second cross-frame members 220, 222 are designed snapped over pivot bosses 402 in slider bearing 304, eliminating the need for a rivet or fastener for assembly. Shown in the cross-section of FIG. 16B, the assembly of the first and second cross-frame members 220, 222 and slider bearing 304 (see FIG. 16A) installs over elongate leg 126 to encapsulate pivot flanges 400 between slider bearing 304 and elongate leg 126, eliminating the need for a rivet or fastener for assembly.

With reference to FIGS. 5A, 5B, 5C, 6, 7A, 7B 12, 13, and 14, the side-frame structures 120, 122 may each include stops 182 attached to a respective elongate leg 126 between the foot structure 132 and the chassis abutment surface 164. The stopper 182 may be positioned beneath the intersection of the leg 128 and the elongate leg 126 to prevent the rotating leg 128 from moving downwardly along the elongate leg 126 beyond the stopper 182. Multiple stoppers 182 may be placed vertical to each other to allow multiple heights at which vertical motion is constrained. In other words, the rotating leg 128 of each side-frame structure may intersect a respective elongate leg 126 at a position between the stopper 182 and the chassis abutment surface 164.

Figure 12:
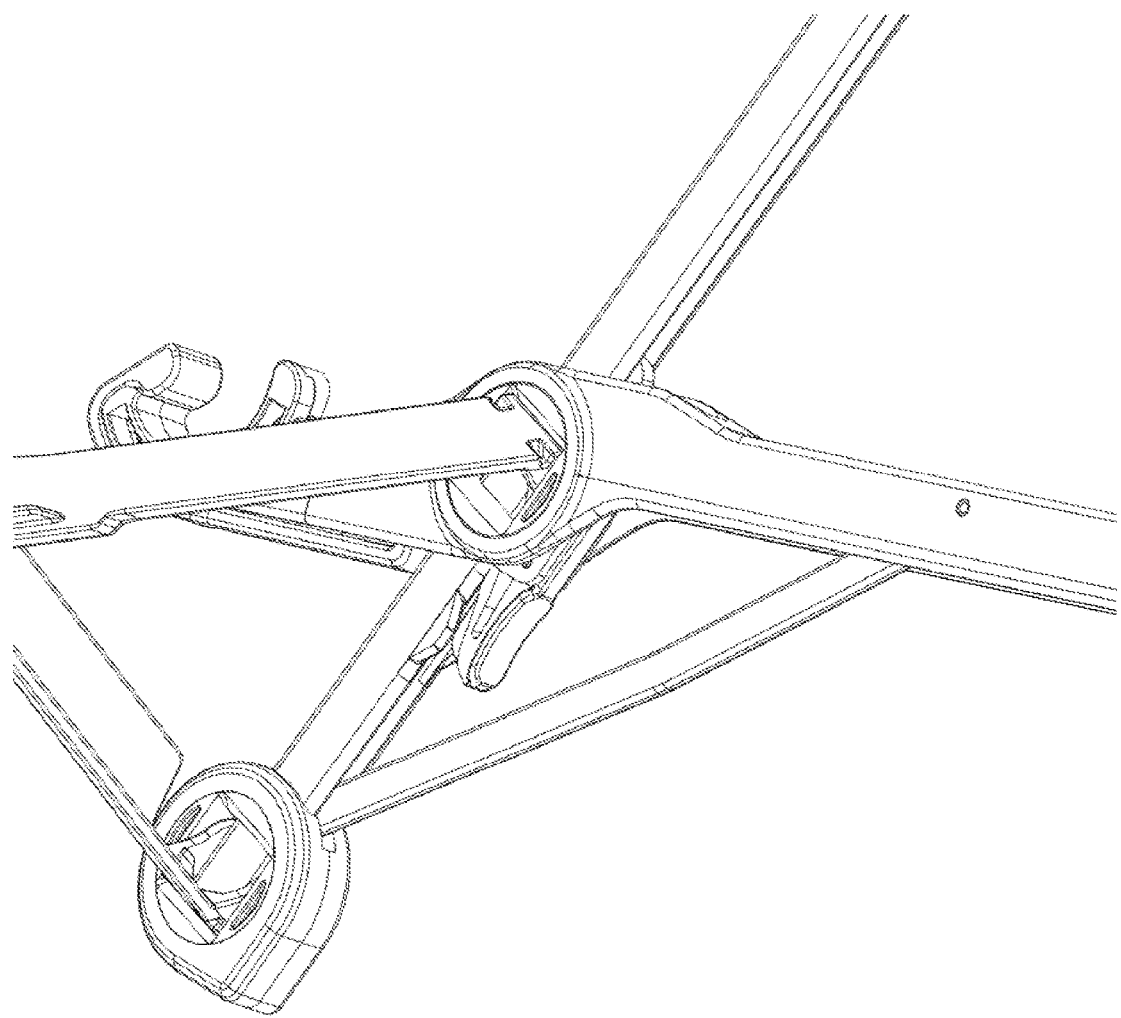
FIG. 12 is an enlarged, fragmentary view of a portion of the stand illustrated in FIG. 1 in the lowest height-adjusted position.
Figure 13:
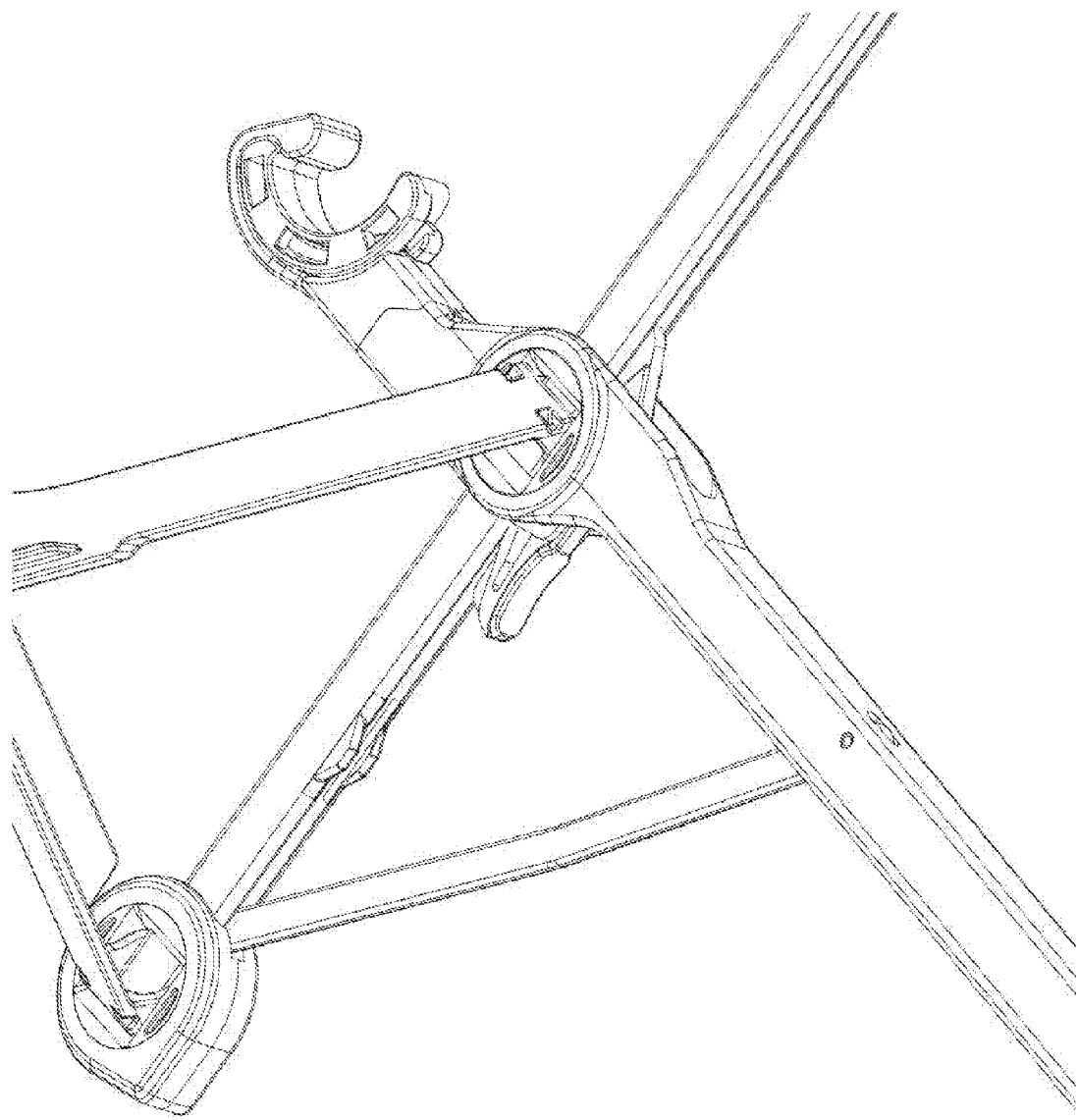
FIG. 13 is an enlarged, fragmentary view of a portion of the stand illustrated in FIG. 1 in the mid height-adjusted position.
Figure 14:
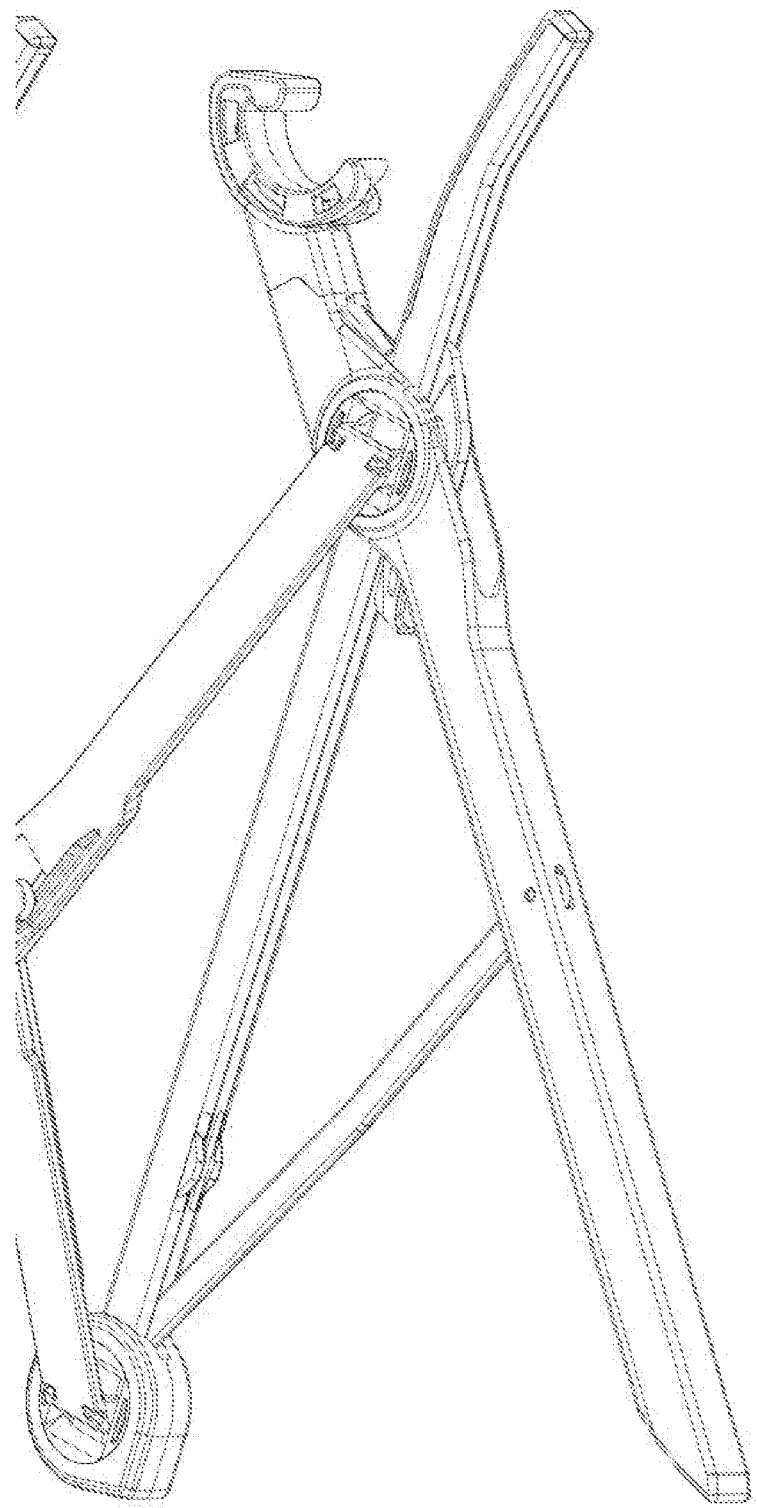
FIG. 14 is an enlarged, fragmentary view of a portion of the stand illustrated in FIG. 1 in the highest height-adjusted position.

With continued reference to FIGS. 12-14, a slider or ratchet mechanism 300 may be attached to each elongate leg 126. Each slider 186 may be slideable longitudinally along a respective elongate leg 126. The sliders 186 may be positioned along the elongate legs 126 between the legs 128 and the chassis abutment surface 164. The stoppers 182 may prevent the ratchet mechanism 300 from moving downwardly along the elongate legs beyond the stoppers 182.

With reference to FIGS. 2, 5A, 5B, 5C, 20, the cross-frame structure 124 of the stand 102 may include a first cross-frame member 220 a second cross-frame member 222. The first cross-frame member 220 may be pivotally attached at a lower end 225 to the first side-frame structure 120 and pivotally attached at an upper end 227 to the second side-frame structure 122 (see FIG. 2). The second cross-frame member 222 may be pivotally attached at an upper end 229 to the first side-frame structure 120 and pivotally attached at a lower end 231 to the second side-frame structure 122 (see FIG. 2). The cross-frame members 220 and 222 may form a scissor mechanism that folds from the fully-extended position (see FIG. 2) to the fully collapsed position (see FIG. 20) and unfolds from the fully-collapsed position to the fully extended position.

With continued reference to FIGS. 2, 5A, 513, 5C, 20 the lower ends 225, 231 of the first and second cross-frame members 220, 222 may be pivotally attached to the opposing foot structures 132. The pivotal attachment may permit the first and second cross-frame members 220, 222 to move about one rotational degree of freedom and restrain movement about the other five degrees of freedom (three translation degrees of freedom and two rotational degrees of freedom) relative to the foot structures 132. As previously discussed, the foot structures 132 may be fixedly secured to a respective elongate leg 126. As such, the lower ends 225, 231 of the first and second cross-frame members 220, 222 may be non-translatable relative to the elongate legs 126.

With continued reference to FIGS. 2, 5A, 513, 5C, 20, the upper ends 227, 229 of the first and second cross-frame members 220, 222 may be pivotally attached to the opposing ratchet mechanism 300. The pivotal attachment may permit the first and second cross-frame members 220, 222 to move about one rotational degree of freedom and restrain movement about the other five degrees of freedom (three translation degrees of freedom and two rotational degrees of freedom) relative to the ratchet mechanism 300. The pivot axes of the upper and lower ends 225, 227, 229, 231 may be parallel to one another.

Figure 20:
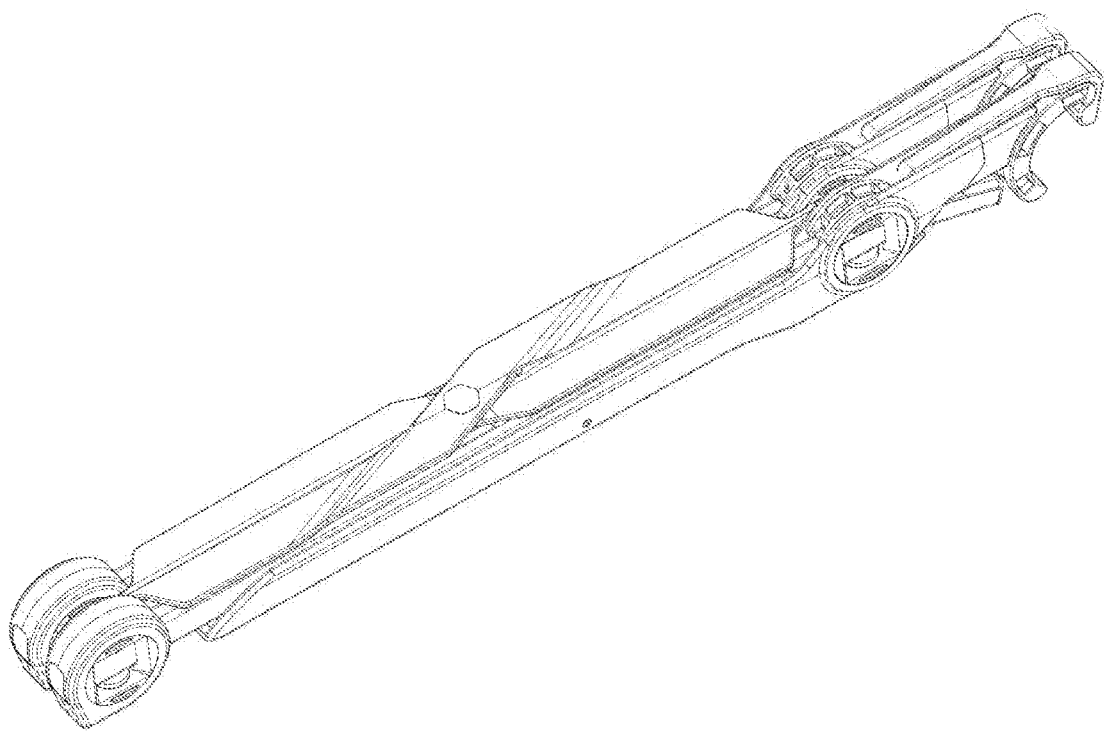
FIG. 20 is an isometric view of the stand illustrated in FIG. 1 in a fully-collapsed position.
Figure 21:
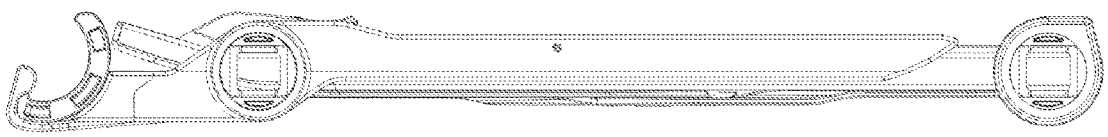
FIG. 21 is a side elevation view of the stand illustrated in FIG. 1 in a fully-collapsed position.

As previously discussed, the ratchet mechanisms 300 may be slideably attached to the elongate legs 126 such that the ratchet mechanisms 300 may slide longitudinally along the elongate legs 126 between the chassis abutment surface 164 and the stoppers 182. Thus, the upper ends 227, 229 of the first and second cross-frame members 220, 222 may be translatable longitudinally along the elongate legs 126 relative to the lower ends 225, 231 of the first and second cross-frame members 220, 222. With reference to FIGS. 2, 8A, 20, the upper ends 227, 229 of the first and second cross-frame members 220, 222 may be slideably attached to the first and second side-frame structures such that the upper ends 227, 229 move away from the lower ends 225, 231, respectively, during collapse of the stand 102 from the fully-extended position (see FIGS. 2 and 15) to the fully-collapsed position (see FIG. 20).

With continued reference to FIGS. 2, 8A, and 20, the first and second cross-frame members 220, 222 may form a torsionally-stiff box structure. As previously discussed, the pivotal attachment of the ends 225, 227, 229, 231 of the first and second cross-frame members 220, 222 may permit in-plane movement of the cross-frame members such that the stand 102 may be collapsed and extended between fully-collapsed and fully-extended positions. The pivotal attachment of the ends 225, 227, 229, 231 of the first and second cross-frame members 220, 222 may prevent or substantially prevent out-of-plane movement of the cross-frame members such that the foot structures 132, 160, the gripping mechanism 136, and the chassis abutment surfaces 164 may be held in fixed relationship to one another upon locking the in-plane movement of the cross-frame members, thereby creating a rigid frame structure that securely supports the laptop computer 104. The offset configuration of the cross-frame members 224, 226, 228, 230 may increase the bending and torsional stiffness of the cross-frame structure 124, thereby strengthening the out-of-plane rigidity of the frame structure while not effecting the in-plane movement of the cross-frame members. As such, the offset first and second cross-frame members 220, 222 and their pivotal attachment to the side-frame structures 120, 122 may create a rigid and strong, yet lightweight, cross-frame structure 124.

With reference to FIGS. 12-14, the stand 102 may be lockable in a fully-extended position. In some implementations, the upper ends 227, 229 of the first and second cross-frame members 220, 222 may be lockable to the first and second side-frame structures 120, 122 to prevent the upper ends 227, 229 from moving relative to the lower ends 225, 231, respectively. The rotating legs 128 may intersect the elongate legs 126 at a position between the stoppers 182 and the upper ends 227, 229 of the first and second cross-frame members 220, 222. As previously discussed, the upper ends 227, 229 of the first and second cross-frame members 220, 222 may be attached to sliding ratchet mechanism 300, which may include a ratchet hook latching element 166. To lock the stand 102 in a fully-extended position, the legs 128 may be rotated relative to the pivot pin 170 and translated relative to the elongate leg 126 such that the spaced-apart posts 184 extend along opposing sides of the stopper 182 (see FIGS. 12 and 13 in sequence). The sliders 186 may be translated longitudinally along the elongate legs 126 away from the chassis abutment surface 164 until the ratchet mechanism 300 abut against a stop 180 of the legs 126.

With reference to FIGS. 5, 6, 15, and 16, once the stand 102 is in the fully-extended, locked position, a user may push the buttons 208 inwardly to disengage the ratchet trigger 302 from the stops 182 and push the ratchet mechanism 300 and rotating leg 128 downwardly along the elongate legs 126 away from the stoppers 182. With specific reference to FIG. 7A, the inwardly movement of the button 208 may cause the ratchet spring 308 to elastically deform and store potential energy within the ratchet spring 308. Upon a user removing the force applied to the buttons 208, the potential energy of the ratchet spring 308 may be converted into kinetic energy and return the ratchet trigger 302 to its original position. Thus, the ratchet hook 166 may automatically reset itself into a latching position.

To expand the stand 102 from the fully-collapsed position shown in FIG. 20 to the fully extended position shown in FIGS. 1, 2, 5-8, and 15, a user may grip the foot structures 132 and pull the foot structures 132 away from one another. As the foot structures 132 are pulled away from one another, the upper ends 227, 229 of the first and second cross-frame members 220, 222 may move towards the lower ends 225, 231, thereby translating the sliders 186 downwardly along the elongate legs 126 from the chassis abutment surfaces 164 toward the stoppers 182.

To attach the laptop 104 to the stand 102, a user may position the stand 102 onto a support surface 118 such that the foot structures 132, 160 are abutted against the support surface 118 in a common plane. The user may position a computing device, such as a laptop 104, over the stand 102 and align the chassis 108 into the gripping mechanism 136. The user may move the laptop 104 downwardly such that the chassis 108 slides into the gap between the elastic gripper 145 and rear contact point 157 of the rotating clamp 138. When positioned in the gripping mechanism 136, the chassis 108 may rest firmly on the chassis abutment surface 164 of the elongate legs 126 (see FIG. 8A). The chassis 108 of the laptop 104 may swing rearwardly and abut against the chassis abutment surfaces 164 due to the location of the center of gravity 168 of the laptop 104 relative to the gripping mechanism 136 (see FIG. 8A). To remove the laptop 104 from the stand 102, a user may lift the laptop 104 upwardly from the stand 102. To facilitate removal, the user may tilt the chassis 108 slightly towards the user and away from the stand 102 to reduce and eliminate the rotational translation of the rotating clamp 138 in the gripping mechanism 136.

To collapse the stand 102 from the fully-extended position shown in FIGS. 1, 2, 5-8, and 15 to the fully-collapsed position shown in FIG. 20, the user may collapse the stand 102 by pushing inwardly on the opposing side-frame structures 120, 122 until the cross-frame structure 124 and the side-frame structures 120, 122 are positioned adjacent to one another in parallel relationship. As shown in FIG. 20, when the stand 102 is in the fully-collapsed position, the cross-frame structure 124 may be flanked on opposing sides by the side-frame structures 120, 122.

The stand may be made of various materials. For example, the stand may be made of high-strength plastic, carbon fiber, aluminum, or any other sufficiently rigid, strong, and lightweight material. In one implementation, the support legs are made of carbon fiber, the legs are made partially of carbon fiber and partially of polyoxymethylene (also known as acetal, polyacetal, and polyformaldehyde), and the cross-members are made of polyoxymethylene.

The foregoing description has broad application. While the provided figures illustrate a stand including a pair of spaced-apart legs that support a laptop screen, in some implementations the stand may include more or less than two legs. For example, in implementations designed for use with laptops having two or more discrete hinges, the stand may include a single leg that includes a screen catch that extends between the discrete hinges. The screen catch may abut against opposing, inwardly-facing end faces of the discrete hinges to secure the laptop to the stand. Further, while the provided figures illustrate a stand in conjunction with a laptop computer, the stand may be used in conjunction with other computing devices having a gap or recess capable of receiving a tab so as to suspend a portion of the computing device from the stand. Accordingly, the discussion of any example is meant only to be explanatory and is not intended to suggest that the scope of the disclosure, including the claims, is limited to these examples. In other words, while illustrative examples of the disclosure have been described in detail herein, it is to be understood that inventive concepts may be otherwise variously embodied and employed, and that the appended claims are intended to be construed to include such variations, except as limited by the prior art.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and/or in fixed relation to each other. Identification references (e.g., first, second, third, fourth, etc.) are not intended to connote importance or priority, but are used to distinguish one feature from another.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. For example, although the provided figures illustrate a stand including both a collapsible frame and a gripping mechanism feature, example stands may include a collapsible frame without the gripping mechanism feature or a fixed frame with a gripping mechanism feature. It should be understood that various features of the certain aspects, embodiments, or configurations of the disclosure may be combined in alternate aspects, embodiments, or configurations. In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present disclosure. Moreover, the following claims are hereby incorporated into this Detailed Description by this reference, with each claim standing on its own as a separate embodiment of the present disclosure.

What is claimed is:

1. A stand for supporting a computing device, the stand comprising:
   a frame member; and
   a gripping mechanism attached to an end of the frame member, the gripping mechanism including a moveable member that moves in an arcuate path relative to the frame member;
   wherein:
   the gripping mechanism further includes an elastic member attached to the moveable member and the frame member;
   the elastic member biases the moveable member towards a first end of the arcuate path; and
   the elastic member wraps around an outer surface of the moveable member when the moveable member moves away from the first end of the arcuate path.

2. The stand of claim 1, wherein:
   the moveable member includes a first end and a second end; and
   a portion of the elastic member wraps at least partially around one of the first or second ends of the moveable member.

3. The stand of claim 2, wherein the portion of the elastic member is configured to engage the computing device.

4. The stand of claim 2, wherein the portion of the elastic member and the other of the first or second ends of the moveable member are configured to grip the computing device to secure the computing device in the gripping mechanism.

5. The stand of claim 1, wherein the elastic member includes a first end attached to the frame member and a second end attached to the moveable member.

6. The stand of claim 1, wherein the gripping mechanism further includes a track defining the arcuate path of the moveable member.

7. The stand of claim 6, wherein the track includes a first portion attached to the frame member and a second curved portion along which the moveable member slides.

8. The stand of claim 6, wherein the moveable member slides along at least a portion of the track.

9. The stand of claim 6, wherein at least a portion of the track has a curved profile that defines the arcuate path of the moveable member.

10. The stand of claim 6, wherein the moveable member is attached to the track such that the moveable member is slideable along a length of the track.

11. The stand of claim 10, wherein the moveable member is attached to the track such that the moveable member is restrained from moving laterally relative to the track.

12. The stand of claim 1, wherein the moveable member is biased towards an end of the arcuate path.

13. The stand of claim 1, wherein the moveable member has a substantially curved profile.

14. A stand for supporting a computing device, the stand comprising:
 a frame member; and
 a gripping mechanism attached to an end of the frame member, the gripping mechanism including a moveable member that moves in an arcuate path relative to the frame member;

wherein:
 the gripping mechanism further includes a track defining the arcuate path of the moveable member;
 the moveable member defines an internal cavity; and
 the track is at least partially received within the internal cavity of the moveable member.

15. The stand of claim 14, wherein the gripping mechanism further includes an elastic member attached to the moveable member and the frame member.

16. The stand of claim 15, wherein the elastic member biases the moveable member towards a first end of the arcuate path.

17. The stand of claim 15, wherein the elastic member includes a first end attached to the frame member and a second end attached to the moveable member.

18. The stand of claim 14, wherein the moveable member is restrained from moving laterally relative to the track.

19. The stand of claim 14, wherein the moveable member is biased towards an end of the arcuate path.

20. The stand of claim 14, wherein the moveable member has a substantially curved profile.

* * * * *